US012578032B2

(12) United States Patent
Sekiguchi et al.

(10) Patent No.: US 12,578,032 B2
(45) Date of Patent: Mar. 17, 2026

(54) ELECTROMAGNETIC ACTUATOR AND VALVE DEVICE

(71) Applicant: MIKUNI CORPORATION, Tokyo (JP)

(72) Inventors: Satoshi Sekiguchi, Kanagawa (JP); Shoichi Ishiguchi, Kanagawa (JP)

(73) Assignee: MIKUNI CORPORATION, Tokyo (JP)

( * ) Notice: Subject to any disclaimer, the term of this patent is extended or adjusted under 35 U.S.C. 154(b) by 108 days.

(21) Appl. No.: 18/677,838

(22) Filed: May 29, 2024

(65) Prior Publication Data

US 2025/0035230 A1 Jan. 30, 2025

(30) Foreign Application Priority Data

Jul. 25, 2023 (JP) ................................. 2023-121075

(51) Int. Cl.
*F16K 31/06* (2006.01)
*H01F 7/16* (2006.01)
*F16K 11/048* (2006.01)

(52) U.S. Cl.
CPC ........... *F16K 31/0675* (2013.01); *H01F 7/16* (2013.01); *F16K 11/048* (2013.01)

(58) Field of Classification Search
None
See application file for complete search history.

(56) References Cited

U.S. PATENT DOCUMENTS

| | | | | |
|---|---|---|---|---|
| 4,278,904 A | * | 7/1981 | Seilly | H01F 7/16 |
| | | | | 310/12.01 |
| 8,154,370 B2 | * | 4/2012 | Ishibashi | H01F 7/1615 |
| | | | | 335/220 |
| 11,598,442 B2 | * | 3/2023 | McGrail | F16K 31/0675 |
| 11,846,365 B2 | * | 12/2023 | Sakai | H01F 7/1607 |

(Continued)

FOREIGN PATENT DOCUMENTS

| | | | | | |
|---|---|---|---|---|---|
| CN | 112032389 A | * | 12/2020 | ......... | F16K 31/0675 |
| DE | 102005019329 A1 | * | 11/2006 | ......... | F02M 51/0664 |
| DE | 102021207354 A1 | * | 1/2023 | ............. | F17C 13/04 |

(Continued)

OTHER PUBLICATIONS

CN 112032389 English Translation (Year: 2020).*

(Continued)

*Primary Examiner* — Umashankar Venkatesan
(74) *Attorney, Agent, or Firm* — JCIPRNET

(57) ABSTRACT

An electromagnetic actuator includes: a movable element 50, reciprocating along an axis S; a coil 122 for excitation; a shaft 60, fixed to the movable element; a first inner yoke 70, movably receiving the movable element; a second inner yoke 80, attracting the movable element through energization of the coil and movably receiving the shaft; and an outer yoke 90, 100, surrounding the coil and bonded to the first inner yoke and the second inner yoke. In a cross section including the axis, a first bonding region between the first inner yoke and the outer yoke and/or a second bonding region between the second inner yoke and the outer yoke have a bonding length $Hd_1+Hs_1$, $Hd_2+Hs_2$ greater than a plate thickness T of the outer yoke.

15 Claims, 21 Drawing Sheets

(56)           References Cited

U.S. PATENT DOCUMENTS

2025/0035220 A1 *   1/2025   Sekiguchi ............. F16K 11/048

FOREIGN PATENT DOCUMENTS

| | | | |
|---|---|---|---|
| JP | H09320840 | 12/1997 | |
| JP | 2011202770 A * | 10/2011 | ........... F16K 27/029 |
| JP | 2017045950 | 3/2017 | |
| WO | WO-2020105296 A1 * | 5/2020 | ............. H01F 7/122 |

OTHER PUBLICATIONS

DE 102005019329 English Translation (Year: 2006).*
DE 102021207354 English Translation (Year: 2023).*
JP 2011202770 English Translation (Year: 2011).*
WO 2020105296 English Translation (Year: 2020).*

* cited by examiner

ELECTROMAGNETIC ACTUATOR AND VALVE DEVICE

CROSS-REFERENCE TO RELATED APPLICATIONS

This application claims the priority benefit of Japan Application No. 2023-121075, filed on Jul. 25, 2023. The entirety of the above-mentioned patent application is hereby incorporated by reference herein and made a part of this specification.

BACKGROUND

Technical Field

The disclosure relates to an electromagnetic actuator configuring an electromagnetic force of a solenoid as a driving force, and particularly relates to an electromagnetic actuator including: a movable element reciprocating linearly; and an inner yoke and an outer yoke forming a magnetic path, and a valve device using the electromagnetic actuator.

Description of Related Art

As a conventional electromagnetic actuator, a solenoid device is known (see, for example, Patent Document 1). The solenoid device includes: a fixed iron core, forming a columnar shape; a movable iron core (movable element) forming a columnar shape by movably facing the fixed iron core; a support tube, having a cylindrical guide portion reciprocatably guiding the movable iron core; a bobbin disposed about the support tube, a coil wound about the bobbin; and a yoke surrounding the coil and bonded to the fixed iron core and the support tube.

In the solenoid device, the yoke is formed in a configuration including a cylindrical portion and two disc portions continuous to the two ends of the cylindrical portion and having bonding holes at centers. The fixed iron core is fitted and bonded to the bonding hole of one of the disc portions, and the support tube is fitted and bonded to the bonding hole of the other disc portion. By using the fixed iron core, the yoke, and the support tube, a magnetic path in which lines of magnetic force pass through the movable iron core is formed.

However, in the bonding structure, the closer the cylindrical portion of the yoke portion is to the bonding hole, the smaller the cross-sectional area, and there is a limit in the magnetic flux (the number of lines of magnetic force) passing through the bonding region between one of the disc portions and the fixed iron core and the bonding region between the other disc portion and the support tube. That is, magnetic saturation may occur.

Another magnetic actuator is also known (see, for example, Patent Document 2). The magnetic actuator includes: a first magnetic portion (movable element) integrally reciprocating with a plunger; a second magnetic portion (stator) forming a magnetic path; and a coil, housed on the inner side of the second magnetic portion. The second magnetic portion includes: a first magnetic delivery portion, having a cylindrical shape and reciprocally housing the first magnetic portion; a second magnetic delivery portion, into which a plunger is reciprocally inserted; and a yoke portion, surrounding a coil.

In the actuator, the yoke portion is formed in a configuration including: a cylindrical portion; and two disc portions continuous with two ends of the cylindrical portion and having bonding holes at centers, the first magnetic delivery portion is fitted with and bonded to the bonding hole of one of the disc portions, the second magnetic delivery portion is fitted with and bonded to the bonding hole of the other of the disc portions, and by using the second magnetic delivery portion, the cylindrical portion, and the first magnetic delivery portion, a magnetic path in which lines of magnetic force pass through the first magnetic portion is formed.

However, in the bonding structure, like the above, the closer the cylindrical portion of the yoke portion is to the bonding hole, the smaller the cross-sectional area. Meanwhile, there is a limit in the magnetic flux passing through the bonding region between one of the disc portions and the first magnetic delivery portion and the bonding region between the other of the disc portions and the second magnetic delivery portion. That is, magnetic saturation may occur.

Therefore, in the conventional electromagnetic actuators (the solenoid device, the actuator), in order to increase the thrust for moving the movable element, it is necessary to increase the number of turns of the coil. As a result, the size and the cost increase. Thus, a structure capable of improving the flow of the lines of magnetic force (magnetic flux) to resolve magnetic saturation and attaining a desired thrust without increasing the number of turns of the coil and increasing the size is desired.

Prior Art Document(s)

Patent Document(s)

[Patent Document 1] Japanese Patent No. H09-320-840
[Patent Document 2] Japanese Laid-open No. 2017-45950

The disclosure provides an electromagnetic actuator and a valve device using the same capable of simplifying the structure, reducing the cost, facilitating the functional reliability, while improving the flow of lines of magnetic force (magnetic flux) to resolve magnetic saturation and obtaining a high thrust.

SUMMARY

An electromagnetic actuator according to an aspect of the disclosure includes: a movable element, reciprocating along a predetermined axis; a coil for excitation; a shaft, fixed to the movable element; a first inner yoke, movably receiving the movable element; a second inner yoke, attracting the movable element through energization of the coil and movably receiving the shaft; and an outer yoke, surrounding the coil and bonded to the first inner yoke and the second inner yoke. In a cross section including the axis, a first bonding region between the first inner yoke and the outer yoke and/or a second bonding region between the second inner yoke and the outer yoke have a bonding length greater than a plate thickness of the outer yoke.

A valve device according to an aspect of the disclosure includes: a housing, defining an upstream passage and a downstream passage through which fluid passes and a valve seat interposed between the upstream passage and the downstream passage; a valve body, reciprocating to be seated and separated with respect to the valve seat; and a drive unit, driving the valve body. The drive unit is the electromagnetic actuator forming a configuration in which an outer yoke includes a cylindrical yoke and a flat yoke and a configuration according to any of the above. The valve body is fixed to the shaft of the electromagnetic actuator.

DESCRIPTION OF THE EMBODIMENTS

Figure 1:
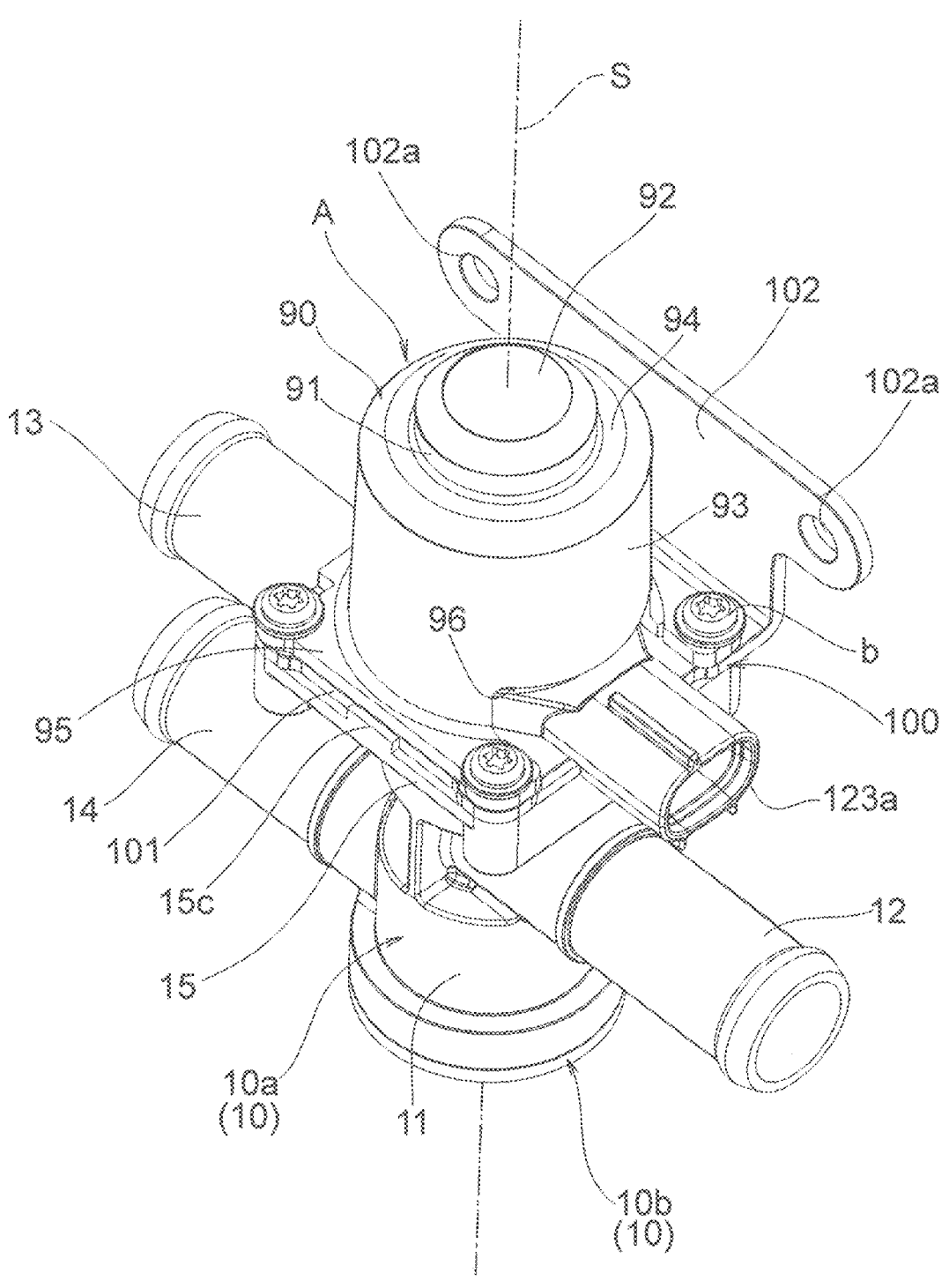
FIG. 1 is a perspective view illustrating the appearance of a valve device including an electromagnetic actuator (drive unit) according to a first embodiment of the disclosure when viewed from the electromagnetic actuator side.

An electromagnetic actuator according to an aspect of the disclosure includes: a movable element, reciprocating along a predetermined axis; a coil for excitation; a shaft, fixed to the movable element; a first inner yoke, movably receiving the movable element; a second inner yoke, attracting the movable element through energization of the coil and movably receiving the shaft; and an outer yoke, surrounding the coil and bonded to the first inner yoke and the second inner yoke. In a cross section including the axis, a first bonding region between the first inner yoke and the outer yoke and/or a second bonding region between the second inner yoke and the outer yoke have a bonding length greater than a plate thickness of the outer yoke.

In the electromagnetic actuator, it may also be configured that the outer yoke includes a bottomed or bottomless cylindrical yoke and a flat yoke bonded to an opening end of the cylindrical yoke, the first inner yoke is bonded to the cylindrical yoke, and the second inner yoke is bonded to the flat yoke.

In the electromagnetic actuator, it may also be configured that the first inner yoke includes: a first outer peripheral surface centered on the axis; and a first annular brim portion protruding radially from the first outer peripheral surface, and the cylindrical yoke includes: an inner peripheral surface, fitted into the first outer peripheral surface; and an annular bonding surface, bonded to the first annular brim portion in a direction of the axis.

In the electromagnetic actuator, it may also be configured that the cylindrical yoke includes: a small-diameter cylindrical portion; a large-diameter cylindrical portion forming a diameter greater than the small-diameter cylindrical portion; and an annular flat plate portion, connecting the small-diameter cylindrical portion and the large-diameter cylindrical portion, the small-diameter cylindrical portion defines the inner peripheral surface, and the annular flat plate portion defines the annular bonding surface.

In the electromagnetic actuator, it may also be configured that in the first bonding region, a clearance is provided between a root region of the first annular brim portion and the cylindrical yoke.

In the electromagnetic actuator, it may also be configured that the cylindrical yoke is a press-molded product that is press-formed.

In the electromagnetic actuator, it may also be configured that on a side opposite to an annular flat surface bonded to the cylindrical yoke, the first annular brim portion has an annular tapered surface that widens toward the annular bonding surface of the cylindrical yoke.

In the electromagnetic actuator, it may also be configured that the second inner yoke includes: a second outer peripheral surface centered on the axis; and a second annular brim portion protruding radially from the second outer peripheral surface, and the flat yoke includes: a fitting hole, defining an inner peripheral surface fitted into the second outer peripheral surface; and an annular bonding surface, bonded to the second annular brim portion in a direction of the axis.

In the electromagnetic actuator, it may also be configured that on a side opposite to an annular flat surface bonded to the flat yoke, the second annular brim portion has an annular tapered surface that widens toward the annular bonding surface of the flat yoke.

In the electromagnetic actuator, it may also be configured that the cylindrical yoke includes a flange portion bonded to the flat yoke.

In the electromagnetic actuator, it may also be configured that the electromagnetic actuator includes a cylindrical member, housing the movable element and the second inner yoke and having a bottomed cylindrical shape exposing the shaft to outside.

A valve device according to an aspect of the disclosure includes: a housing, defining an upstream passage and a downstream passage through which fluid passes and a valve seat interposed between the upstream passage and the downstream passage; a valve body, reciprocating to be seated and separated with respect to the valve seat; and a drive unit, driving the valve body. The drive unit is the electromagnetic actuator forming a configuration in which an outer yoke includes a cylindrical yoke and a flat yoke and a configuration according to any of the above. The valve body is fixed to the shaft of the electromagnetic actuator.

In the valve device, it may also be configured that the downstream passage includes a first downstream passage and a second downstream passage branching from the upstream passage, the valve seat includes a first valve seat facing the first downstream passage and a second valve seat facing the second downstream passage, and the valve body includes a first valve body corresponding to the first valve seat and a second valve body corresponding to the second valve seat, the first valve body and the second valve body being separated from each other in the direction of the axis.

In the valve device, it may also be configured that at a time when the coil included in the electromagnetic actuator is not energized, the first valve body is separated from the first valve seat, and the second valve body is seated on the second valve seat, and at a time when the coil included in the electromagnetic actuator is not energized, the first valve body is seated on the first valve seat, and the second valve body is separated from the second valve seat.

In the valve device, it may also be configured that the flat yoke of the electromagnetic actuator includes an attachment portion for attachment to an applicable target.

According to the electromagnetic actuator with the configuration, the structure is simplified, the cost is reduced, the functional reliability is facilitated, while the flow of lines of magnetic force (magnetic flux) can be improved to resolve magnetic saturation, and a high thrust can be obtained. In addition, according to the valve device using the electromagnetic actuator of the disclosure, power consumption is reduced, whereas a desired driving force is obtained, and the opening/closing operation of the valve body can be carried out reliably.

Embodiments of the disclosure will be described below with reference to the accompanying drawings.

A valve device including an electromagnetic actuator of the disclosure is applied to, for example, a cooling water circulation system or the like of a vehicle to adjust the flow of cooling water as a fluid.

Figure 2:
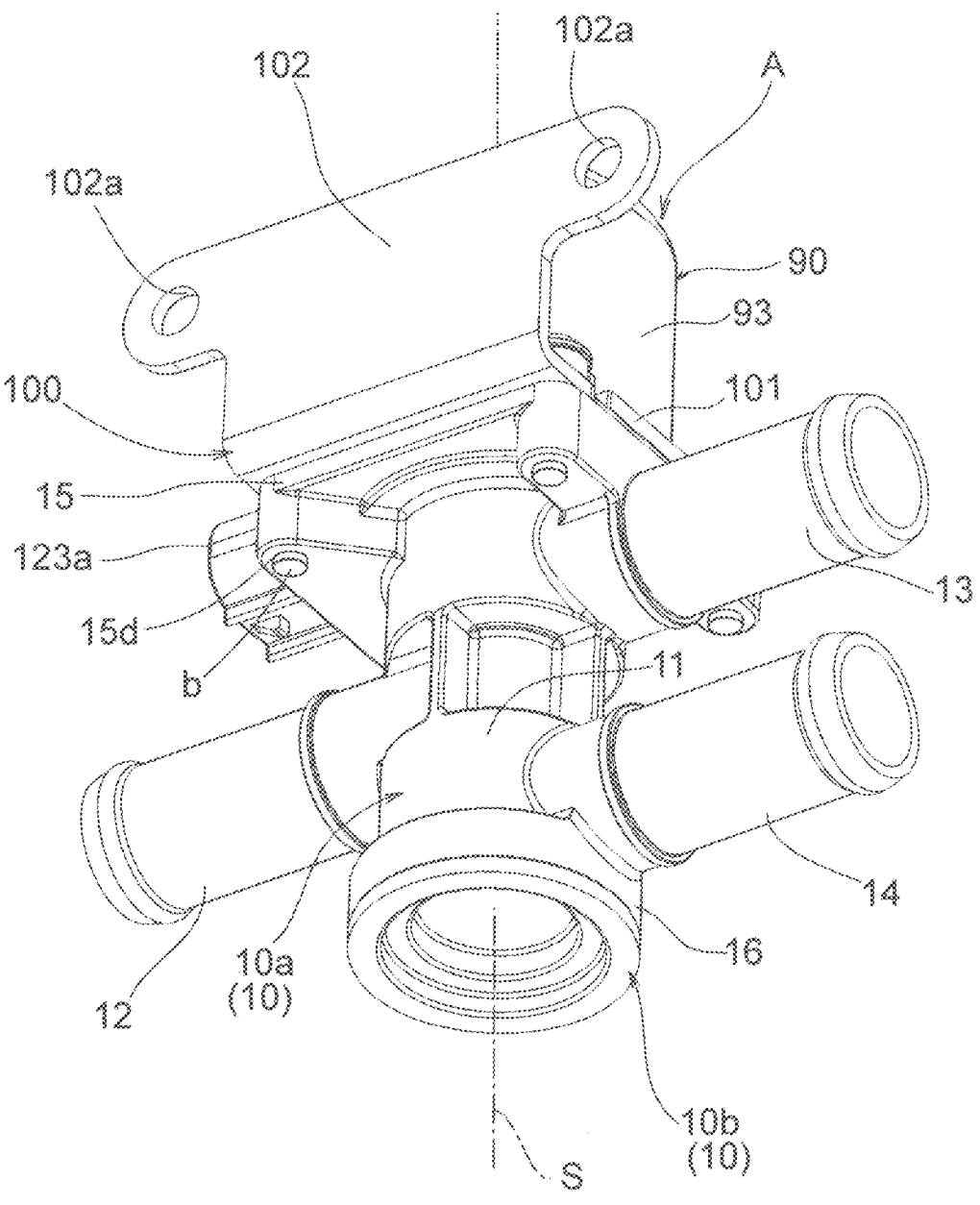
FIG. 2 is a perspective view illustrating the appearance of the valve device including the electromagnetic actuator (drive unit) according to the first embodiment of the disclosure when viewed from a side opposite to the electromagnetic actuator.
Figure 3:
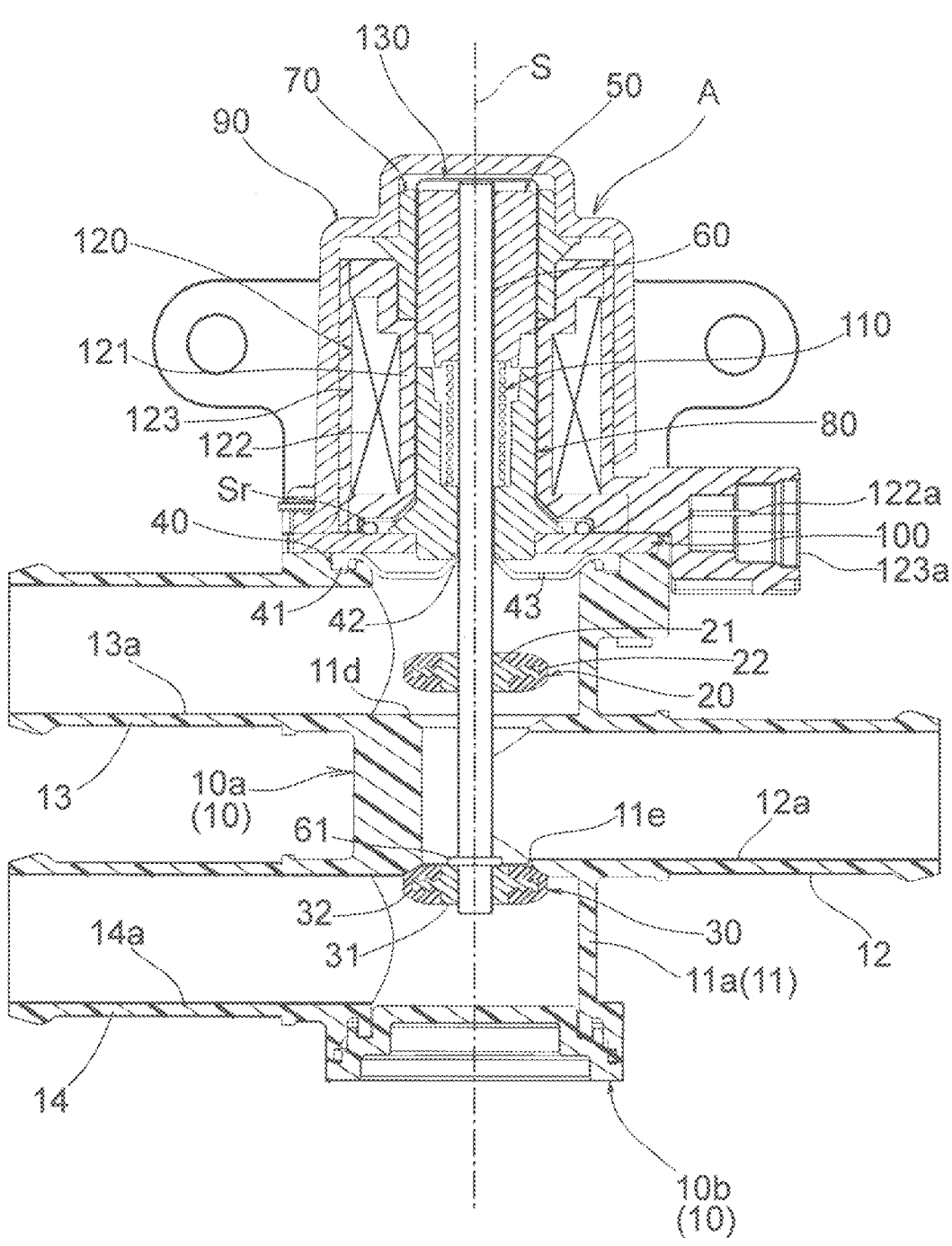
FIG. 3 is a cross-sectional view illustrating the valve device including the electromagnetic actuator according to the first embodiment taken along a surface through which an axis passes.

As shown in FIG. 1 to FIG. 3, a valve device according to an embodiment includes a housing 10, a first valve body 20 and a second valve body 30 as valve bodies, a sealing member 40, and an electromagnetic actuator A according to the first embodiment as a drive unit fixed to the housing 10.

The housing 10 is made of a resin material or the like, and includes a housing body 10a and a housing cover 10b.

Figure 6:
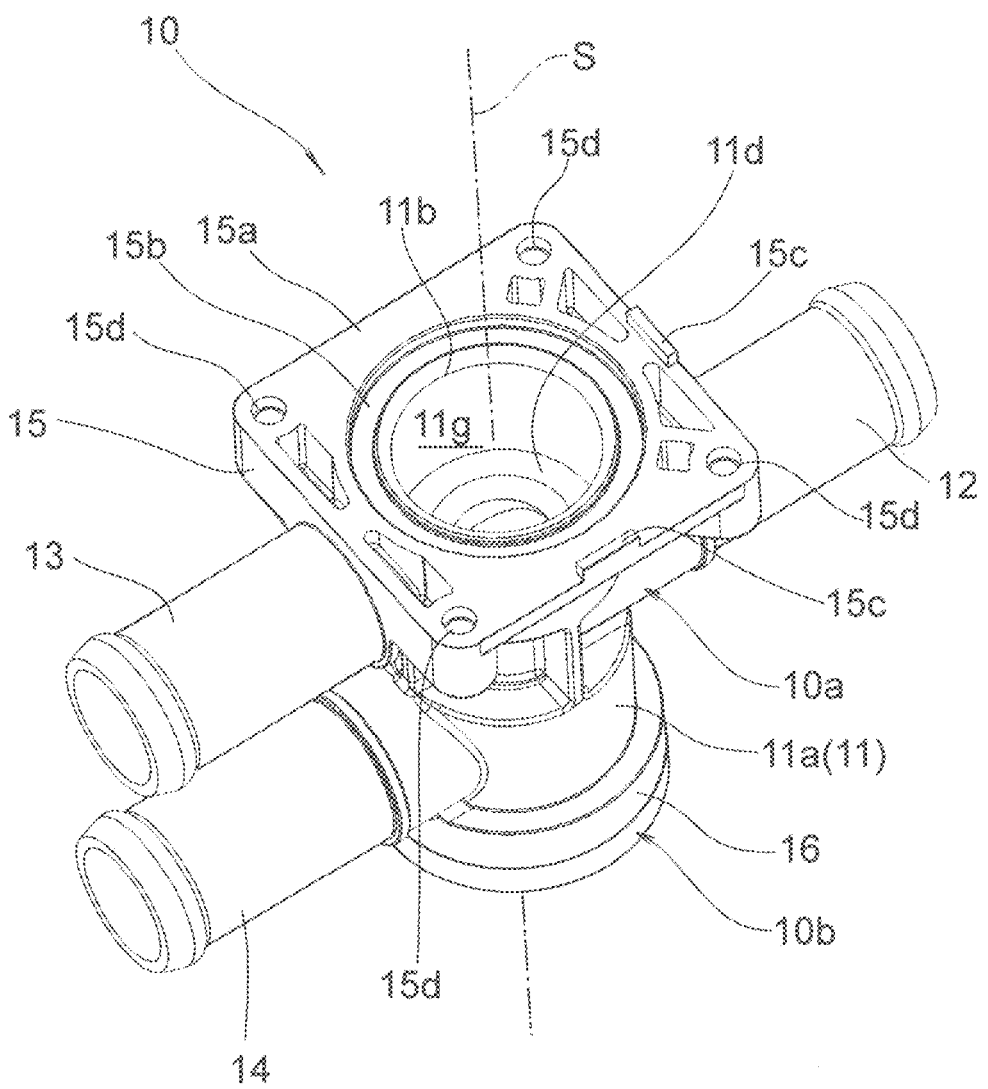
FIG. 6 is a perspective view illustrating the appearance of a housing forming a portion of the valve device.
Figure 7:
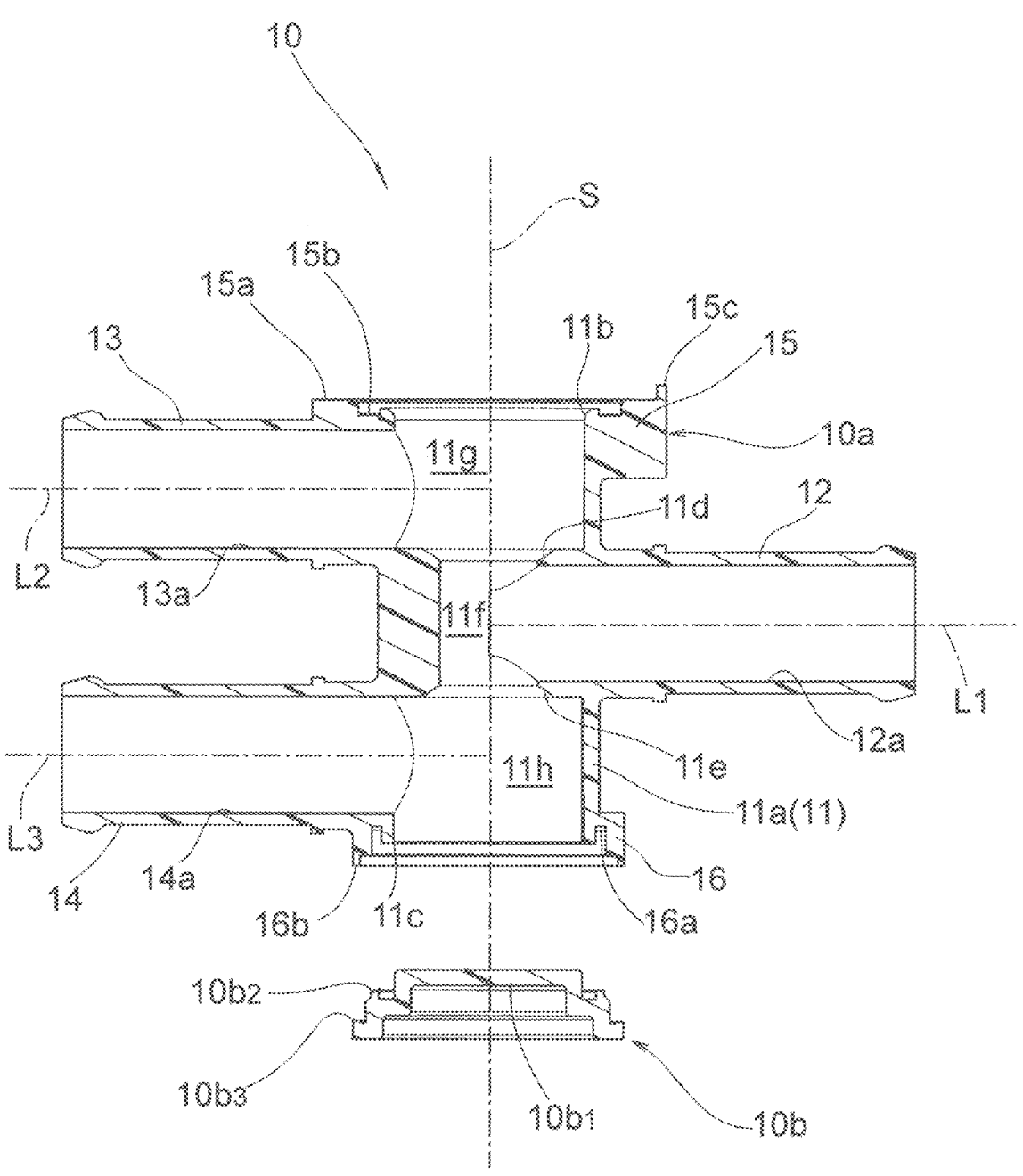
FIG. 7 is an exploded cross-sectional view illustrating the housing forming a portion of the valve device.

As shown in FIG. 6 and FIG. 7, the housing body 10a includes a cylindrical portion 11, an upstream pipe portion 12, a first downstream pipe portion 13, a second downstream pipe portion 14, a flange portion 15, and a cover coupling portion 16.

The cylindrical portion 11 is formed into a substantially cylindrical shape centered on an axis S, and includes a side wall 11a, a first opening 11b, a second opening 11c, a first valve seat 11d, a second valve seat 11e, a central chamber 11f, a first working chamber 11g, and a second working chamber 11h.

The first opening 11b is a circular hole centered on the axis S on the inside of a bonding surface 15a of the flange portion 15 so as to face the first working chamber 11g, and is formed so that the first valve body 20 can be inserted from one side in the direction of the axis S. Then, the first opening 11b is closed by bonding the electromagnetic actuator A with the sealing member 40 being sandwiched therebetween.

The second opening 11c is a circular hole centered on the axis S on the inside of the cover coupling portion 16 so as to face the second working chamber 11h, and is formed so that the second valve body 30 can be inserted from the other side in the direction of the axis S. Then, after the second valve body 30 is assembled, the second opening 11c is closed by coupling with the housing cover 10b.

The first valve seat 11d is a region on which the first valve body 20 is seated, and is formed into an annular tapered surface that forms a part of a conical surface centered on the axis S and widens toward the side of the first opening 11b.

The second valve seat 11e is a region on which the second valve body 30 is seated, and is formed into an annular tapered surface that forms a part of a conical surface centered on the axis S and widens toward the side of the second opening 11c.

The central chamber 11f is formed between the first valve seat 11d and the second valve seat 11e in the direction of the axis S, communicates with an upstream passage 12a defined by the upstream pipe portion 12, and also functions as an upstream passage located upstream of the first valve seat 11d and the second valve seat 11c.

The first working chamber 11g is formed downstream of the first valve seat 11d, is a region in which the first valve body 20 reciprocates in the direction of the axis S, communicates with a first downstream passage 13a defined by the first downstream pipe portion 13, and also functions as a first downstream passage located downstream of the first valve seat 11d.

The second working chamber 11h is formed downstream of the second valve seat 11e, is a region in which the second valve body 30 reciprocates in the direction of the axis S, communicates with a second downstream passage 14*a* defined by the second downstream pipe portion 14, and also functions as a second downstream passage located downstream of the second valve seat 11*c*.

The upstream pipe portion 12 is a region to which a fluid inlet pipe of the applicable object (here, an inlet pipe forming a part of the cooling water circulation system) is connected, and defines the upstream passage 12*a* that has a circular cross section centered on an axis L1 perpendicular to the axis S.

The first downstream pipe portion 13 is a region to which a fluid outlet pipe of the applicable object (here, an outlet pipe forming a part of the cooling water circulation system) is connected, and defines the first downstream passage 13*a* that has a circular cross section centered on an axis L2 perpendicular to the axis S.

The second downstream pipe portion 14 is a region to which another fluid outlet pipe of the applicable object (here, another outlet pipe forming a part of the cooling water circulation system) is connected, and defines the second downstream passage 14*a* that has a circular cross section centered on an axis L3 perpendicular to the axis S.

The flange portion 15 is a region where the electromagnetic actuator A is bonded and fixed, and is formed in a substantially rectangular outline around the first opening 11*b*. The flange portion 15 includes the bonding surface 15*a* that forms a flat surface perpendicular to the axis S, an annular groove 15*b* into which the sealing member 40 is fitted, a positioning protrusion 15*c* that protrudes from the bonding surface 15*a* in the direction of the axis S, and four female screw holes 15*d* into which fastening screws b are screwed.

The cover coupling portion 16 is a region where the housing cover 10*b* is coupled, and includes an annular groove 16*a* centered on the axis S around the second opening 11*c*, and an annular bonding surface 16*b* around the annular groove 16*a*.

The housing cover 10*b* is coupled to the cover coupling portion 16 to close the second working chamber 11*h*, and includes a disc-shaped lid portion 10*b*1 that fits into the second opening 11*c*, an annular protrusion 10*b*2 that fits into the annular groove 16*a*, and an annular bonding surface 10*b*3 that bonds the annular bonding surface 16*b*.

Then, when assembling the valve device, after the second valve body 30 is fitted and fixed to the shaft 60 of the electromagnetic actuator A, the housing cover 10*b* is fitted to the cover coupling portion 16 of the housing body 10*a*, and is coupled by adhesion, welding or the like, as necessary.

As shown in FIG. 3, the first valve body 20 is fitted and fixed to a predetermined position of the shaft 60 of the electromagnetic actuator A, and is formed by a valve base material 21 formed by using a metal material, such as stainless metal, or a resin material and an elastic sealing member 22 molded to cover the valve base material 21.

The elastic seal member 22 is formed by using a rubber material, etc., and is formed to be brought into close contact with the first valve seat 11*d* when the first valve body 20 is located at a valve-closed position.

Figure 13:
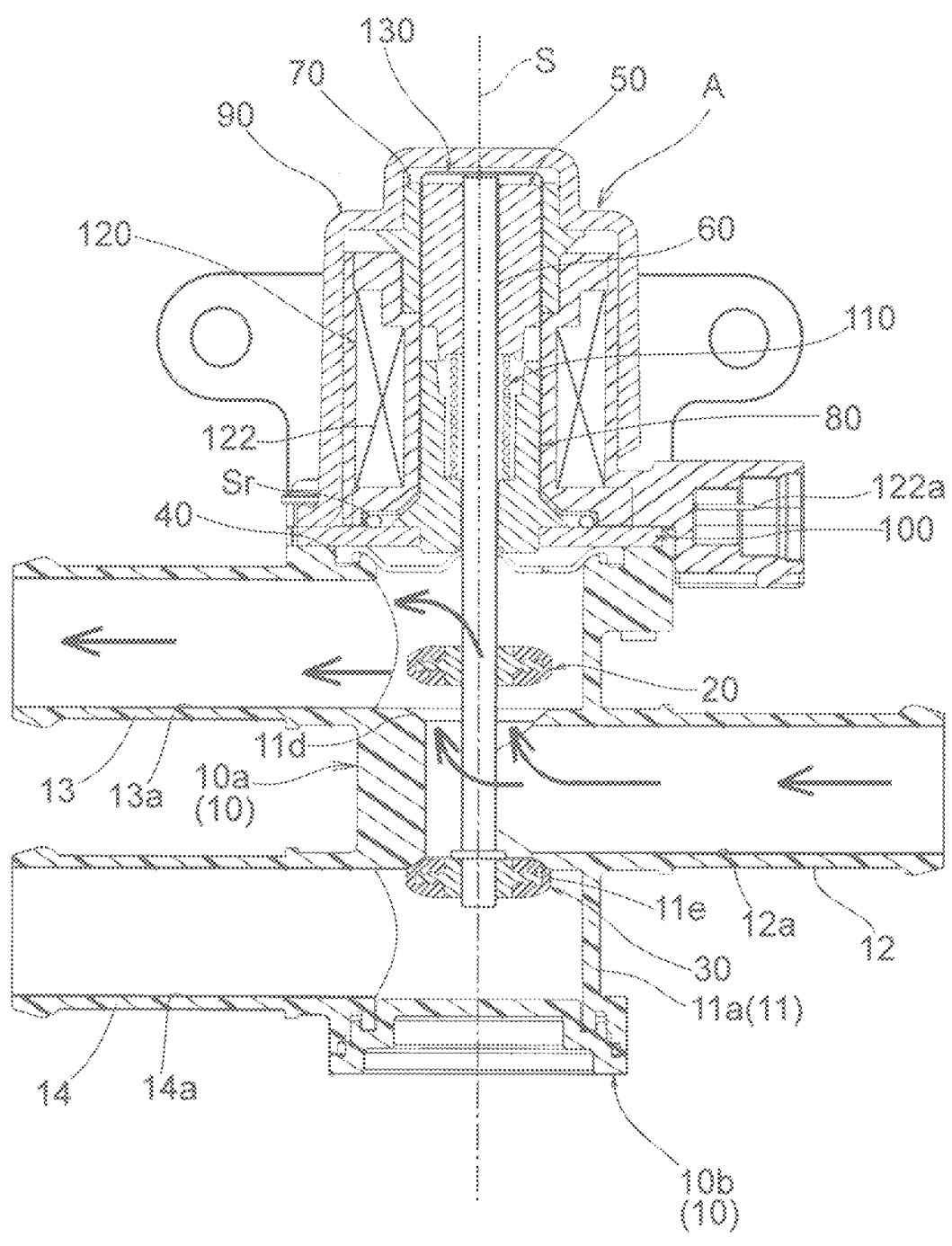
FIG. 13 is a cross-sectional view illustrating open and closed states of a valve body when the electromagnetic actuator according to the first embodiment at the rest position.
Figure 14:
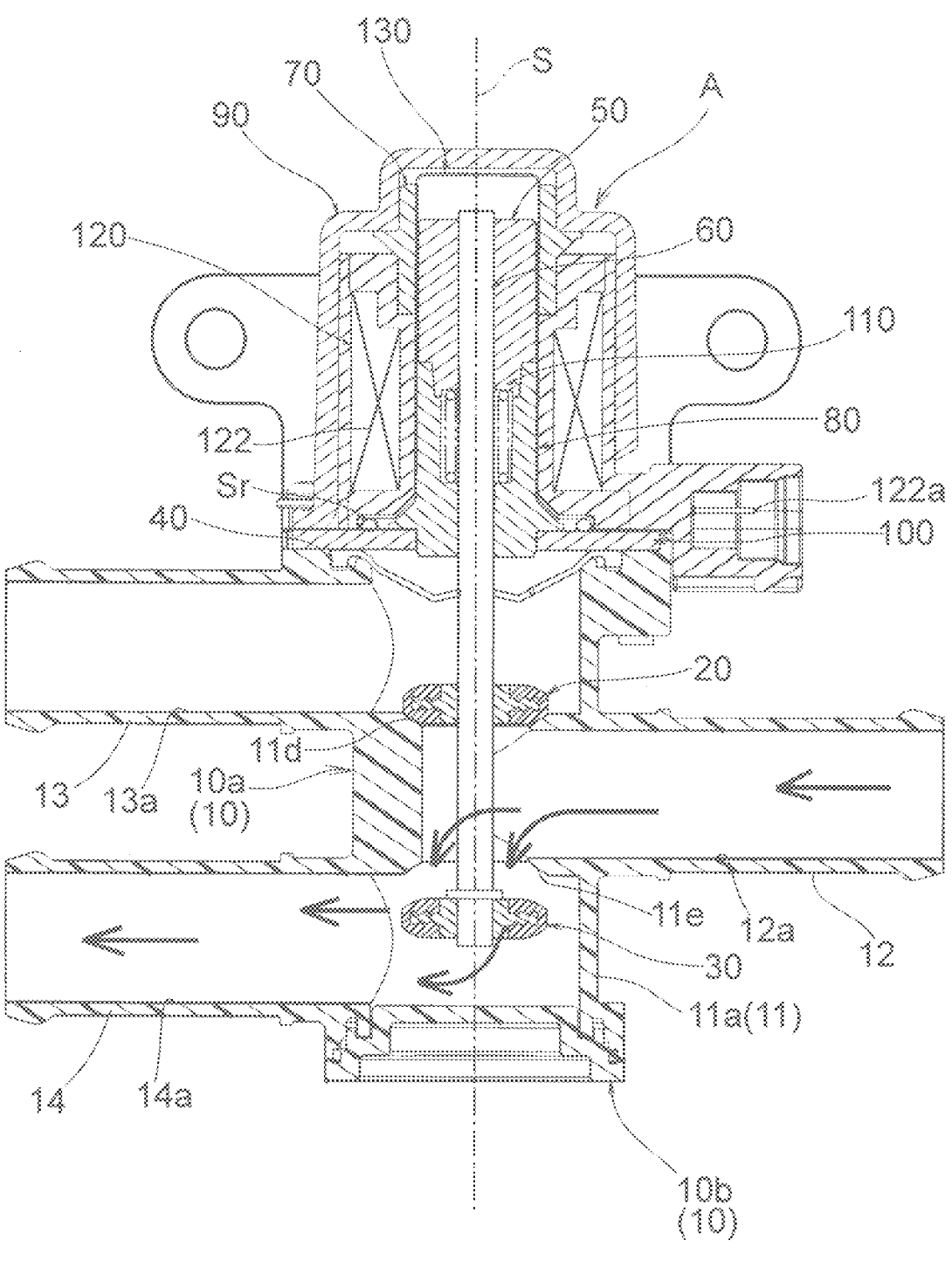
FIG. 14 is a cross-sectional view illustrating the open and closed states of the valve body when the electromagnetic actuator according to the first embodiment at the operating position.

That is, at the rest position shown in FIG. 13, the first valve body 20 is separated from the first valve seat 11*d* and opens the valve, and, at the operating position shown in FIG. 14, the first valve body 20 is seated on the first valve seat 11*d* and closes the valve.

As shown in FIG. 3, the second valve body 30 is fitted and fixed to a predetermined position of the shaft 60 of the electromagnetic actuator A, and is formed by a valve base material 31 formed by using a metal material, such as stainless metal, or a resin material and an elastic sealing member 32 molded to cover the valve base material 31.

The elastic seal member 32 is formed by using a rubber material, etc., and is formed to be brought into close contact with the second valve seat 11*e* when the second valve body 30 is located at a valve-closed position.

That is, at the rest position shown in FIG. 13, the second valve body 30 is seated on the second valve seat 11*e* and closes the valve, and, at the operating position shown in FIG. 14, the second valve body 30 is separated from the second valve seat 11*e* and opens the valve.

That is, the first valve body 20 and the second valve body 30 are disposed to be separated from each other with respect to the shaft 60 in the direction of the axis S. Through the reciprocation of the shaft 60, the first valve body 20 reciprocates in the first working chamber 11*g* to be seated on and separated from the first valve seat 11*d*, and the second valve body 30 reciprocates in the second working chamber 11*h* to be seated on and separated from the second valve seat 11*e*.

The sealing member 40 is formed into a disc shape using an elastically deformable thin film rubber material, and includes an annular fitting portion 41, a central connecting portion 42, and a communication hole 43, as shown in FIG. 3.

The communication hole 43 is formed in a size that does not allow foreign matters, etc., to pass through, and contributes to a pressure regulation effect as a ventilation hole.

Then, the sealing member 40 is connected by passing the shaft 60 of the electromagnetic actuator A through the central connecting portion 42, the annular fitting portion 41 is fitted into the annular groove 15*b* of the housing 10, and the sealing member 40 is held by bonding a flat yoke 100 of the electromagnetic actuator A.

In this assembled state, the sealing member 40 performs a sealing function at the bonding interface between the housing 10 and the electromagnetic actuator A, and is elastically deformed to move integrally with the shaft 60 and prevents foreign matter, etc., in the fluid from entering the side of the electromagnetic actuator A. In addition, the sealing member 40 provides a pressure regulation effect through the communication hole 43 when elastically deformed so as not to inhibit the movement of the shaft 60.

Figure 4:
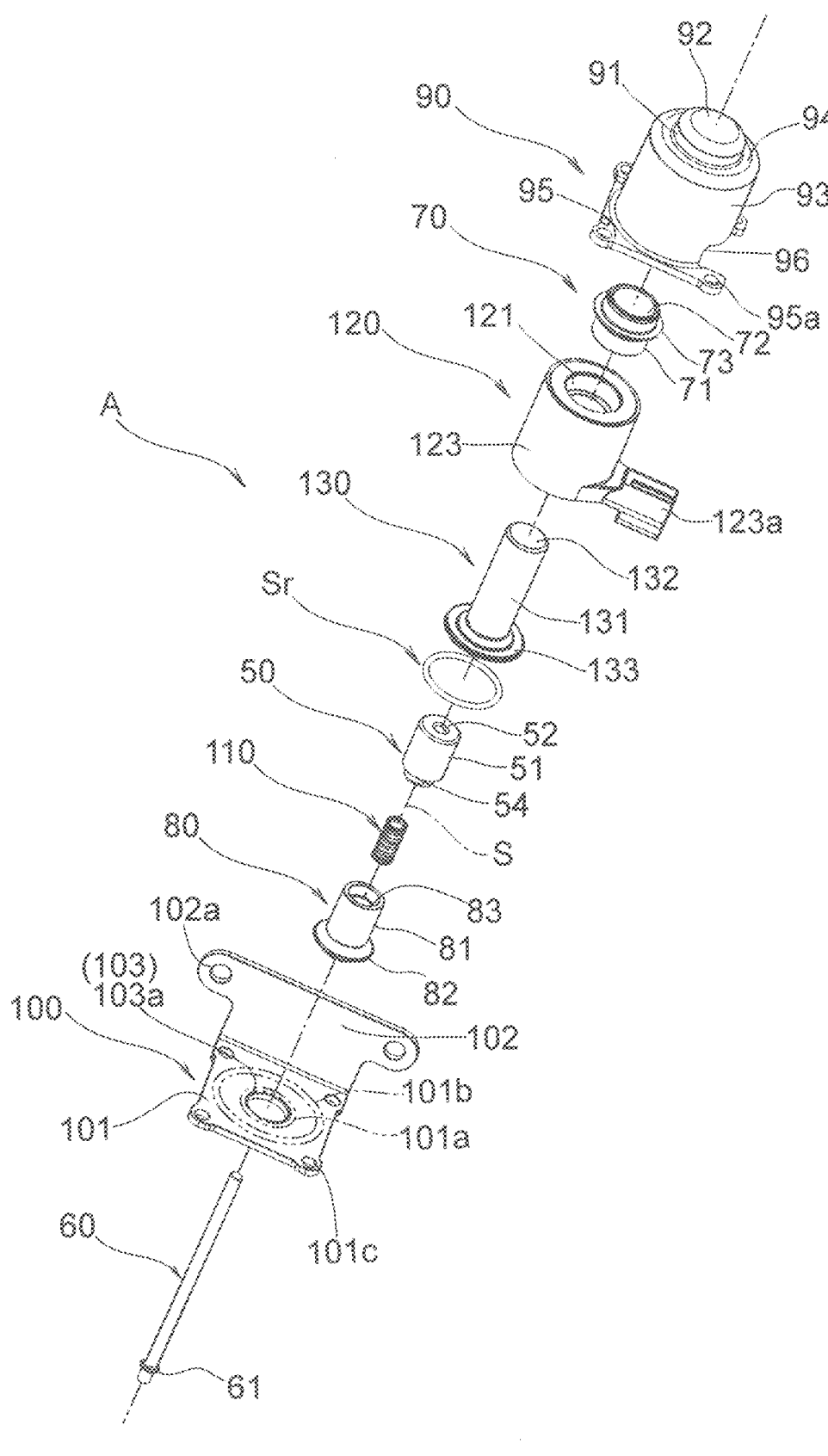
FIG. 4 is an exploded perspective view illustrating the electromagnetic actuator (drive unit) according to the first embodiment.

As shown in FIG. 3 and FIG. 4, the electromagnetic actuator A includes a movable element 50, the shaft 60, a first inner yoke 70, a second inner yoke 80, a cylindrical yoke 90 and a flat yoke 100 as the outer yoke, an urging spring 110, a coil module 120, a cylindrical member 130, and a sealing member Sr. In addition, the coil module 120 includes a bobbin 121, a coil 122 for excitation, and a molded portion 123 in which the bobbin 121 and the coil 122 are embedded.

Figure 5:
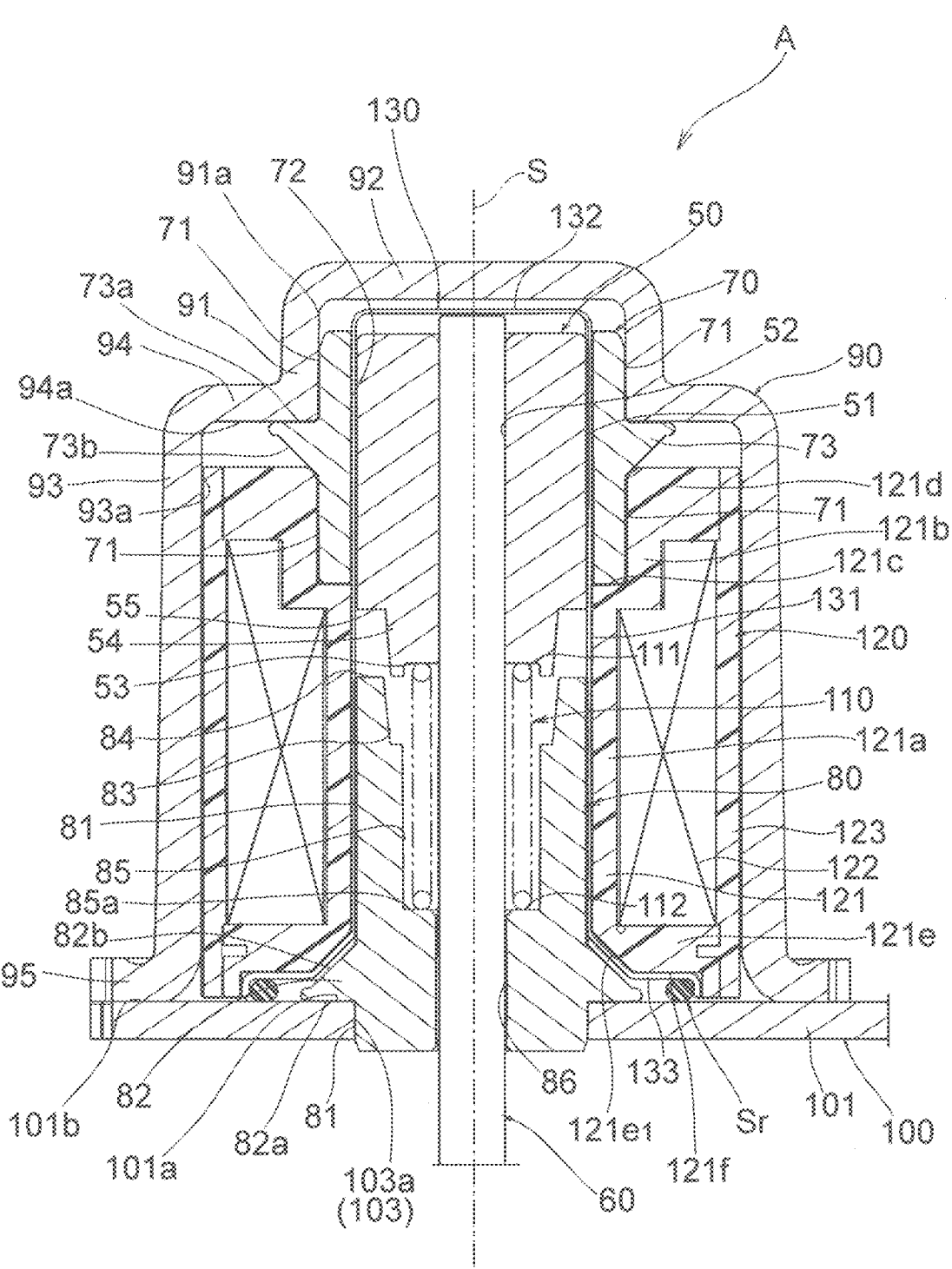
FIG. 5 is a cross-sectional view taken along a cross section including an axis of the electromagnetic actuator according to the first embodiment.

The movable element 50 functions as a magnetic path for passing lines of magnetic force and also functions as a movable iron core that moves in the direction of the axis S when the coil 122 is energized, and is formed into a cylindrical shape by machining or forging using free-cutting steel (SUM) or the like. As shown in FIG. 4 and FIG. 5, the movable element 50 includes an outer peripheral surface 51, a fitting hole 52, a spring receiving portion 53, a convex portion 54, and an annular end surface 55.

The outer peripheral surface 51 is formed as a cylindrical surface centered on the axis S, and is slidably in contact with the inner wall of the cylindrical member 130.

The fitting hole 52 is a through hole centered on the axis S and is a region into which one end side region of the shaft 60 is press-fitted. The fitting hole 52 is formed to have an inner diameter slightly smaller than the outer diameter dimension of the shaft 60.

The spring receiving portion 53 is formed into a circular concave portion centered on the axis S, receives one end portion 111 of the urging spring 110, and positions the one end portion 111 in a direction perpendicular to the axis S.

The convex portion 54 is formed into a truncated cone shape, and is formed to fit into a concave portion 83 of the second inner yoke 80 in a non-contact manner.

The annular end surface 55 is formed as a flat surface perpendicular to the axis S, and faces an annular end surface 84 of the second inner yoke 80 in the direction of the axis S.

In addition, in order to make the movement of the movable element 50 smooth, for example, a slot extending in the direction of the axis S may be formed on the outer peripheral surface so as to adjust the front and rear pressures when the movable element 50 moves.

The shaft 60 is formed into a long columnar shape in the direction of the axis S using a non-magnetic material, for example, a metal material such as stainless steel or a resin material, and includes the positioning portion 61 near the other end side.

As shown in FIGS. 3 and 4, the positioning portion 61 is formed into a brim shape that protrudes in the radial direction, and abuts against and positions the second valve body 30 in the direction of the axis S.

Then, the shaft 60 is fixed to the movable element 50 by fitting one end side region into the fitting hole 52. Further, the central connecting portion 42 of the sealing member 40 is connected to the shaft 60 approximately at the center in the direction of the axis S, the first valve body 20 is fixed by fitting at a position closer to the other end (free end) side than the center in the direction of the axis S, and the second valve body 30 is fixed by fitting so as to abut against positioning portion 61 on the other end side. Then, the shaft 60 reciprocates in the direction of the axis S integrally with the movable element 50, the first valve body 20, and the second valve body 30.

The first inner yoke 70 is formed by machining or forging using soft iron or the like, and functions as a magnetic path for passing lines of magnetic force. As shown in FIG. 4 and FIG. 5, the first inner yoke 70 is formed into a cylindrical shape, and includes a first outer peripheral surface 71, an inner peripheral surface 72, and a first annular brim portion 73.

The first outer peripheral surface 71 is formed as a cylindrical surface centered on the axis S, and is formed to be fitted into the inner peripheral surface 91a of the small-diameter cylindrical portion 91 of the cylindrical yoke 90 and fitted into the bobbin 121 of the coil module 120.

The inner peripheral surface 72 is formed as a cylindrical surface centered on the axis S, and is formed so that the cylindrical member 130 is fitted therein.

The first annular brim portion 73 is formed into a disc shape that protrudes in the radial direction perpendicular to the axis S from the first outer peripheral surface 71, and includes an annular flat surface 73a and an annular tapered surface 73b.

The annular flat surface 73a is a flat surface perpendicular to the axis S, and is bonded to an annular bonding surface 94a of the cylindrical yoke 90 in the direction of the axis S.

The annular tapered surface 73b is formed on the side opposite to the annular flat surface 73a, and is formed to widen toward the annular bonding surface 94a of the cylindrical yoke 90.

The second inner yoke 80 is formed by machining or forging using soft iron or the like, and functions as a magnetic path for passing lines of magnetic force and also functions as a fixed iron core that attracts the movable element 50 when the coil 122 is energized. As shown in FIG. 4 and FIG. 5, the second inner yoke 80 is formed into a cylindrical shape, and includes a second outer peripheral surface 81, a second annular brim portion 82, a concave portion 83, an annular end surface 84, a spring housing concave portion 85, and a guide hole 86.

The second outer peripheral surface 81 is formed as a cylindrical surface centered on the axis S, and is formed to be fitted into the bobbin 121 of the coil module 120 via the cylindrical member 130 and fitted into the fitting hole 103 of the flat yoke 100.

The second annular brim portion 82 is formed into a disc shape that protrudes in the radial direction perpendicular to the axis S from the second outer peripheral surface 81, and includes an annular flat surface 82a and an annular tapered surface 82b.

The annular flat surface 82a is a flat surface perpendicular to the axis S, and is bonded to the annular bonding surface 101a of the flat yoke 100 in the direction of the axis S. The annular tapered surface 82b is formed on the side opposite to the annular flat surface 82a, and is formed to widen toward the annular bonding surface 101a of the flat yoke 100.

The concave portion 83 is formed into a truncated cone shape, and is formed to receive the convex portion 54 of the movable element 50 in a non-contact manner in the direction of the axis S.

The annular end surface 84 is formed as a flat surface perpendicular to the axis S, and faces the annular end surface 55 of the movable element 50 in the direction of the axis S.

The spring housing concave portion 85 is formed to have a smaller diameter than the concave portion 83 and receives the urging spring 110, and includes a spring receiving portion 85a that receives the other end portion 112 of the urging spring 110.

The guide hole 86 is formed as a cylindrical hole centered on the axis S, and guides the shaft 60 slidably in the direction of the axis S.

The cylindrical yoke 90 is a press-molded product that is press-formed (deep-drawn) into a bottomed cylindrical shape using a metal plate such as soft iron having a predetermined thickness so as to function as a magnetic path for passing lines of magnetic force. As shown in FIG. 1, FIG. 4, and FIG. 5, the cylindrical yoke 90 includes a small-diameter cylindrical portion 91, a bottom wall 92, a large-diameter cylindrical portion 93, an annular flat plate portion 94, a flange portion 95, and a cutout portion 96.

The small-diameter cylindrical portion 91 defines the inner peripheral surface 91a centered on the axis S. The first outer peripheral surface 71 of the first inner yoke 70 is fitted into the inner peripheral surface 91a. That is, the first inner yoke 70 is bonded and fixed to the cylindrical yoke 90 in the radial direction perpendicular to the axis S via the inner peripheral surface 91a of the small-diameter cylindrical portion 91.

The bottom wall 92 is formed continuously with the end portion of the small-diameter cylindrical portion 91 in the direction of the axis S, and is arranged without contacting the cylindrical member 130.

The large-diameter cylindrical portion 93 defines an inner peripheral surface 93a centered on the axis S. The molded portion 123 of the coil module 120 is fitted into the inner peripheral surface 93a.

The annular flat plate portion 94 is formed continuously in the boundary region between the small-diameter cylindrical portion 91 and the large-diameter cylindrical portion 93, and defines the annular bonding surface 94a to which the annular flat surface 73a of the first inner yoke 70 is bonded in the direction of the axis S.

The flange portion 95 is formed into a substantially rectangular shape continuously from the end portion of the large-diameter cylindrical portion 93, and includes four circular holes 95a through which the fastening screws b pass. Then, in the assembled state, the flange portion 95 is bonded to the flat yoke 100 to form a magnetic path.

The cutout portion 96 is formed to expose a connector 123a of the coil module 120 to the outside.

The flat yoke 100 is punched and bent using a metal plate such as soft iron having a predetermined thickness so as to be bonded to the open end of the cylindrical yoke 90 and function as a magnetic path for passing lines of magnetic force. As shown in FIG. 4 and FIG. 5, the flat yoke 100 includes a substantially rectangular flat plate portion 101, an attachment portion 102 bent from the flat plate portion 101 and extending in the direction of the axis S, and a fitting hole 103.

The flat plate portion 101 includes an annular bonding surface 101a to which the annular flat surface 82a of the second inner yoke 80 is closely bonded in the direction of the axis S, an annular bonding surface 101b to which the flange portion 95 of the cylindrical yoke 90 is closely bonded in the direction of the axis S, and four circular holes 101c through which the fastening screws b pass.

The attachment portion 102 is used to attach the valve device to the applicable object, and includes two circular holes 102a through which fixing bolts pass.

The fitting hole 103 is a region into which the second outer peripheral surface 81 of the second inner yoke 80 is fitted, and defines a cylindrical inner peripheral surface 103a centered on the axis S. The inner peripheral surface 103a is closely bonded to the second outer peripheral surface 81 of the second inner yoke 80 in the radial direction perpendicular to the axis S.

That is, the second inner yoke 80 is bonded and fixed to the flat yoke 100 in the radial direction perpendicular to the axis S via the inner peripheral surface 103a of the fitting hole 103.

The urging spring 110 is a compression type coil spring, and is arranged to be compressed in the direction of the axis S with one end portion 111 abutting against the spring receiving portion 53 of the movable element 50 and the other end portion 112 abutting against the spring receiving portion 85a of the second inner yoke 80. Then, the urging spring 110 urges the movable element 50 toward the rest position in the direction of the axis S.

As described above, the coil module 120 includes the bobbin 121, the coil 122 for excitation, and the molded portion 123.

The bobbin 121 is formed using a resin material, and as shown in FIG. 5, the bobbin 121 includes a small-diameter cylindrical portion 121a centered on the axis S, a large-diameter cylindrical portion 121b, an annular step portion 121c, a flange portion 121d, a flange portion 121e, and a concave portion 121f.

The small-diameter cylindrical portion 121a is formed so that the cylindrical member 130 is fitted inside the small-diameter cylindrical portion 121a, and the coil 122 is wound around the outside thereof.

The large-diameter cylindrical portion 121b is formed so that the first outer peripheral surface 71 of the first inner yoke 70 is fitted inside the large-diameter cylindrical portion 121b, and the coil 122 is wound around the outside thereof.

The annular step portion 121c abuts against the end surface of the first inner yoke 70 so as to be positioned in the direction of the axis S in the assembled state.

The flange portion 121d is formed into an annular shape centered on the axis S, and is arranged to face the first annular brim portion 73 (annular tapered surface 73b) of the first inner yoke 70 and the annular flat plate portion 94 of the cylindrical yoke 90 in the direction of the axis S.

The flange portion 121e is formed into an annular shape centered on the axis S, defines an annular tapered surface 121el in the root region thereof, and is arranged to face the flat yoke 100 in the direction of the axis S and receive the flange portion 133 of the cylindrical member 130.

The concave portion 121f is formed to receive the flange portion 133 of the cylindrical member 130 and receive the sealing member Sr.

The coil 122 is used for excitation to generate magnetic force when energized, and is wound around the small-diameter cylindrical portion 121a and the large-diameter cylindrical portion 121b of the bobbin 121 and connected to two terminals 122a.

The molded portion 123 is molded using a resin material, and is molded to cover the entire body and expose the terminals 122a inside the connector 123a in a state where the coil 122 is wound around the bobbin 121 and the terminals 122a are connected.

The cylindrical member 130 is press-formed (deep-drawn) into a bottomed cylindrical shape using a thin metal plate made of a non-magnetic material such as stainless steel. As shown in FIG. 4 and FIG. 5, the cylindrical member 130 includes a cylindrical portion 131 centered on the axis S, a bottom wall 132, and a flange portion 133.

The cylindrical portion 131 is formed so that the outer peripheral surface 51 of the movable element 50 is slidably inserted into the cylindrical portion 131 and the second outer peripheral surface 81 of the second inner yoke 80 is fitted into the cylindrical portion 131, and the inner peripheral surface 72 of the first inner yoke 70 and the small-diameter cylindrical portion 121a of the bobbin 121 of the coil module 120 are fitted to the outside thereof.

The bottom wall 132 is arranged so that the movable element 50 and the shaft 60 are not in contact with each other in the rest state.

The flange portion 133 abuts against the flange portion 121e of the bobbin 121 of the coil module 120 to be positioned in the direction of the axis S.

Then, in the assembled state, the cylindrical member 130 houses the movable element 50 and the second inner yoke 80, and exposes the shaft 60 fixed to the movable element 50 to the outside, here, to the internal space of the housing 10 (the first working chamber 11g, the central chamber 11f, and the second working chamber 11h).

That is, the cylindrical member 130 has the function of slidably guiding the movable element 50, and isolating the internal region in which the movable element 50 operates from the external region to prevent fluid from leaking to the outside.

The sealing member Sr is an O-ring made of a rubber material, and is interposed between the flange portion 133 of the cylindrical member 130 and the flat yoke 100 in the assembled state to seal and prevent fluid from leaking to the outside.

Figure 8:
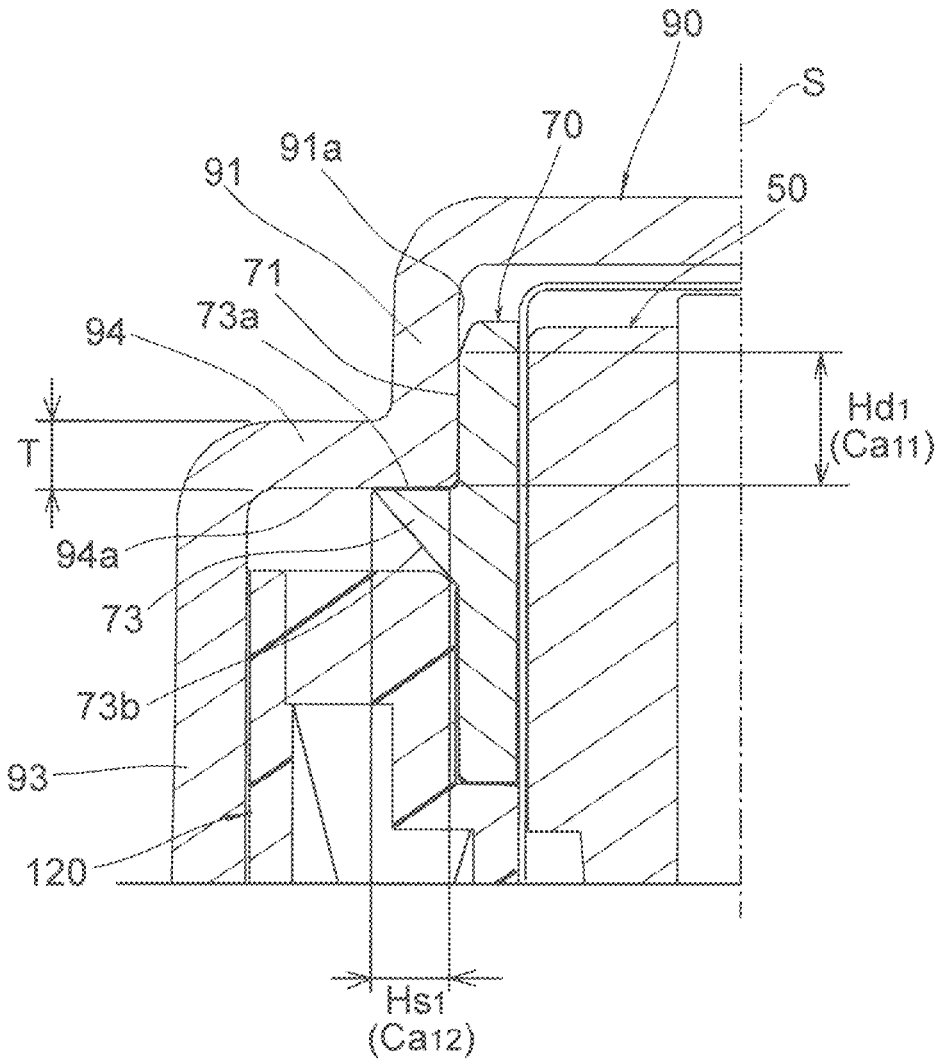
FIG. 8 is a partial cross-sectional view illustrating a first bonding region between a first inner yoke and an outer yoke (cylindrical yoke) of the electromagnetic actuator according to the first embodiment.

As described above, in the configuration including the first inner yoke 70 and the outer yoke (the cylindrical yoke 90 and the flat yoke 100), the first bonding region between the first inner yoke 70 and the cylindrical yoke 90, as shown in FIG. 8, is a bonding region $Ca_{11}$ between the first outer peripheral surface 71 and the inner peripheral surface $91a$ and a bonding region $Ca_{12}$ between the annular flat surface $73a$ and the annular bonding surface $94a$.

In the cross section including the axis S as shown in FIG. 8, when the plate thickness of the cylindrical yoke 90 is set as T, the bonding length of the bonding region $Ca_{11}$ in the direction of the axis S is set as $Hd_1$, and the bonding length of the bonding region $Ca_{12}$ in the radial direction is set as $Hs_1$, a relationship $T<(Hd_1+Hs_1)$ is satisfied.

That is, the first bonding region between the first inner yoke 70 and the cylindrical yoke 90 as the outer yoke has a bonding length $(Hd_1+Hs_1)$ greater than the plate thickness T of the cylindrical yoke 90 in the cross section including the axis S. In this way, compared with the case where the bonding region between the first inner yoke 70 and the cylindrical yoke 90 is the bonding length of the plate thickness T of the cylindrical yoke 90 alone, a longer bonding length $(Hd_1+Hs_1)$ can be obtained. Therefore, magnetic resistance can be reduced (increased permeance). As a result, in the first bonding region, the magnetic flux generated through energizing the coil 122 can be effectively used without having magnetic saturation.

In addition, by providing the first annular brim portion 73 as the bonding region between the first inner yoke 70 and the cylindrical yoke 90, the magnetic path area of the bonding interface can be increased while the magnetic path can be decreased, and the magnetic resistance can be effectively reduced (permeance is increased). In particular, by providing the first annular brim portion 73, at the time of fixing the first inner yoke 70 to the cylindrical yoke 90, the first outer peripheral surface 71 is fitted into the inner peripheral surface $91a$ to be radially positioned, the annular flat surface $73a$ can be bonded to the annular bonding surface $94a$ to be positioned in the direction of the axis S, the fixing can be firm simply by combination through fitting without welding, etc., and mechanical stiffness can be ensured. In addition, by providing the annular tapered surface $73b$ on the side opposite to the annular flat surface $73a$ of the first annular brim portion 73, the weight and size can be reduced by removing a region where the function as a magnetic path is difficult to achieve, while the space for arranging the bobbin 121 can be secured.

Figure 9:
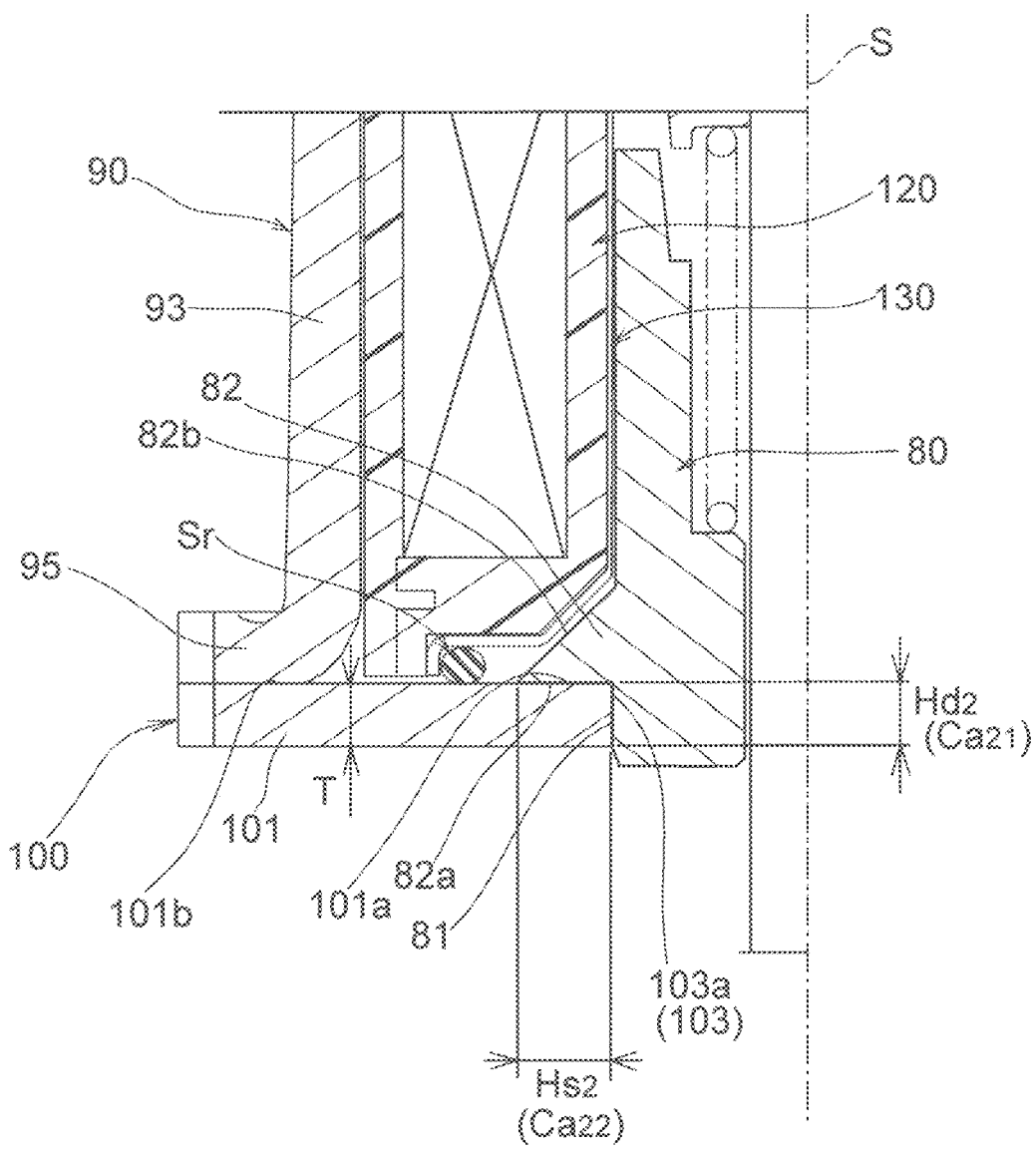
FIG. 9 is a partial cross-sectional view illustrating a first bonding region between a second inner yoke and an outer yoke (flat yoke) of the electromagnetic actuator according to the first embodiment.

In addition, as described above, in the configuration including the second inner yoke 80 and the outer yoke (the cylindrical yoke 90 and the flat yoke 100), the second bonding region between the second inner yoke 80 and the flat yoke 100, as shown in FIG. 9, is a bonding region $Ca_{21}$ between the second outer peripheral surface 81 and the inner peripheral surface $103a$ and a bonding region $Ca_{22}$ between the annular flat surface $82a$ and the annular bonding surface $101a$. In the cross section including the axis S as shown in FIG. 9, when the plate thickness of the flat yoke 100 is set as T, the bonding length of the bonding region $Ca_{21}$ in the direction of the axis is set as $Hd_2$, and the bonding length of the bonding region $Ca_{22}$ in the radial direction is set as $Hs_2$, a relationship $T<(Hd_2+Hs_2)$ is satisfied.

That is, the second bonding region between the second inner yoke 80 and the flat yoke 100 as the outer yoke has a bonding length $(Hd_2+Hs_2)$ greater than the plate thickness T of the flat yoke 100 in the cross section including the axis S. In this way, compared with the case where the bonding region between the second inner yoke 80 and the flat yoke 100 is only the bonding length of the plate thickness T of the flat yoke 100, a longer bonding length $(Hd_2+HS_2)$ can be obtained. Therefore, magnetic resistance can be reduced (increased permeance). As a result, in the second bonding region, the magnetic flux generated through energizing the coil 122 can be effectively used without having magnetic saturation.

In addition, by providing the second annular brim portion 82 as the bonding region between the second inner yoke 80 and the flat yoke 100, the magnetic path area of the bonding interface can be increased while the magnetic path can be decreased, and the magnetic resistance can be effectively reduced (permeance is increased). In particular, by providing the second annular brim portion 82, at the time of fixing the second inner yoke 80 to the flat yoke 100, the second outer peripheral surface 81 is fitted into the inner peripheral surface $103a$ to be radially positioned, the annular flat surface $82a$ can be bonded to the annular bonding surface $101a$ to be positioned in the direction of the axis S, the fixing can be firm simply by combination through fitting without welding, etc., and mechanical stiffness can be ensured. In addition, by providing the annular tapered surface $82b$ on the side opposite to the annular flat surface $82a$ of the second annular brim portion 82, the weight and size can be reduced by removing a region where the function as a magnetic path is difficult to achieve, while the space for arranging the bobbin 121 can be secured.

Then, the operation of the electromagnetic actuator A with the above configuration is described with reference to FIGS. 10 to 12.

Firstly, in the rest state in which the coil 122 is not energized, the shaft 60 and the movable element 50 are positioned, through the urging force of the urging spring 110, at the rest position corresponding to the position (FIG. 13) in which the second valve body 30 is seated on the second valve seat $11e$. At the rest position, the movable element 50 and the shaft 60 are maintained in a state not in contact with the bottom wall 132 of the cylindrical member 130.

Figure 10:
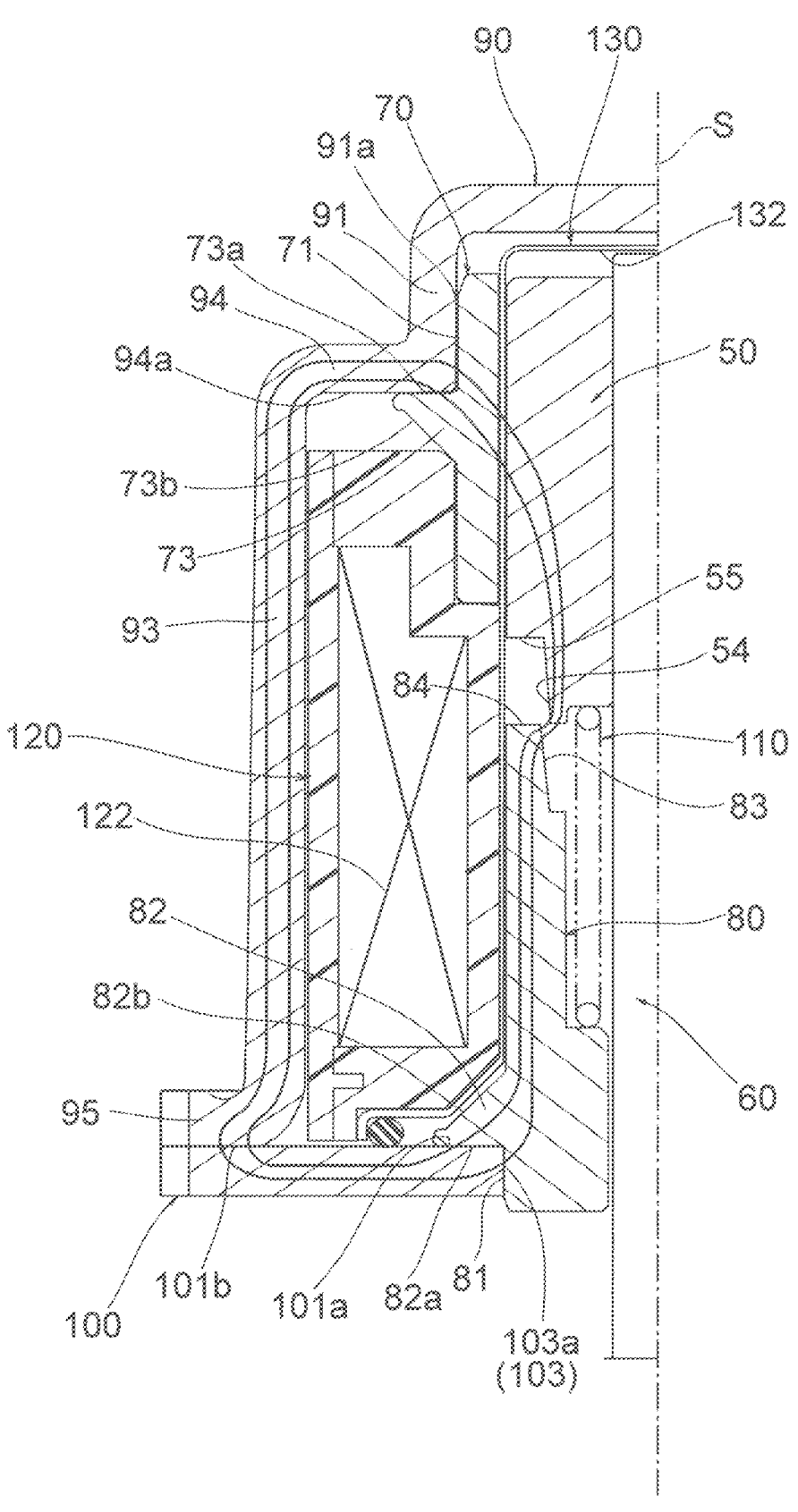
FIG. 10 is a partial cross-sectional view describing an operation of the electromagnetic actuator according to the first embodiment, and illustrating a a movable element immediately after a coil is energized at a rest position and a flow of lines of magnetic force.

Immediately after the coil 122 is energized in the rest state, the lines of magnetic force flow, as shown in FIG. 10. That is, in the first bonding region between the first inner yoke 70 and the cylindrical yoke 90, the lines of magnetic force passing through the annular flat plate portion 94 flows from the inner peripheral surface $91a$ to the movable element 50 through the first outer peripheral surface 71 and flows from the annular bonding surface $94a$ to the movable element 50 through the annular flat surface $73a$ of the first annular brim portion 73.

In addition, the lines of magnetic force flow from the tip outer edge region of the convex portion 54 to the inner edge region of the concave portion 83 between the movable element 50 and the second inner yoke 80.

In addition, in the second bonding region between the second inner yoke 80 and the flat yoke 100, the lines of magnetic force passing through the second inner yoke 80 flows from the second outer peripheral surface 81 to the flat yoke 100 through the inner peripheral surface $103a$ and flows from the annular flat surface $82a$ of the second annular brim portion 82 to the flat yoke 100 via the annular bonding surface $101a$.

Then, the lines of magnetic force flowing into the flat yoke 100 flow from the annular bonding surface $101b$ to the cylindrical yoke 90 via the flange portion 95. Through the flow of the lines of magnetic force, a close-loop magnetic path is formed.

Figure 11:
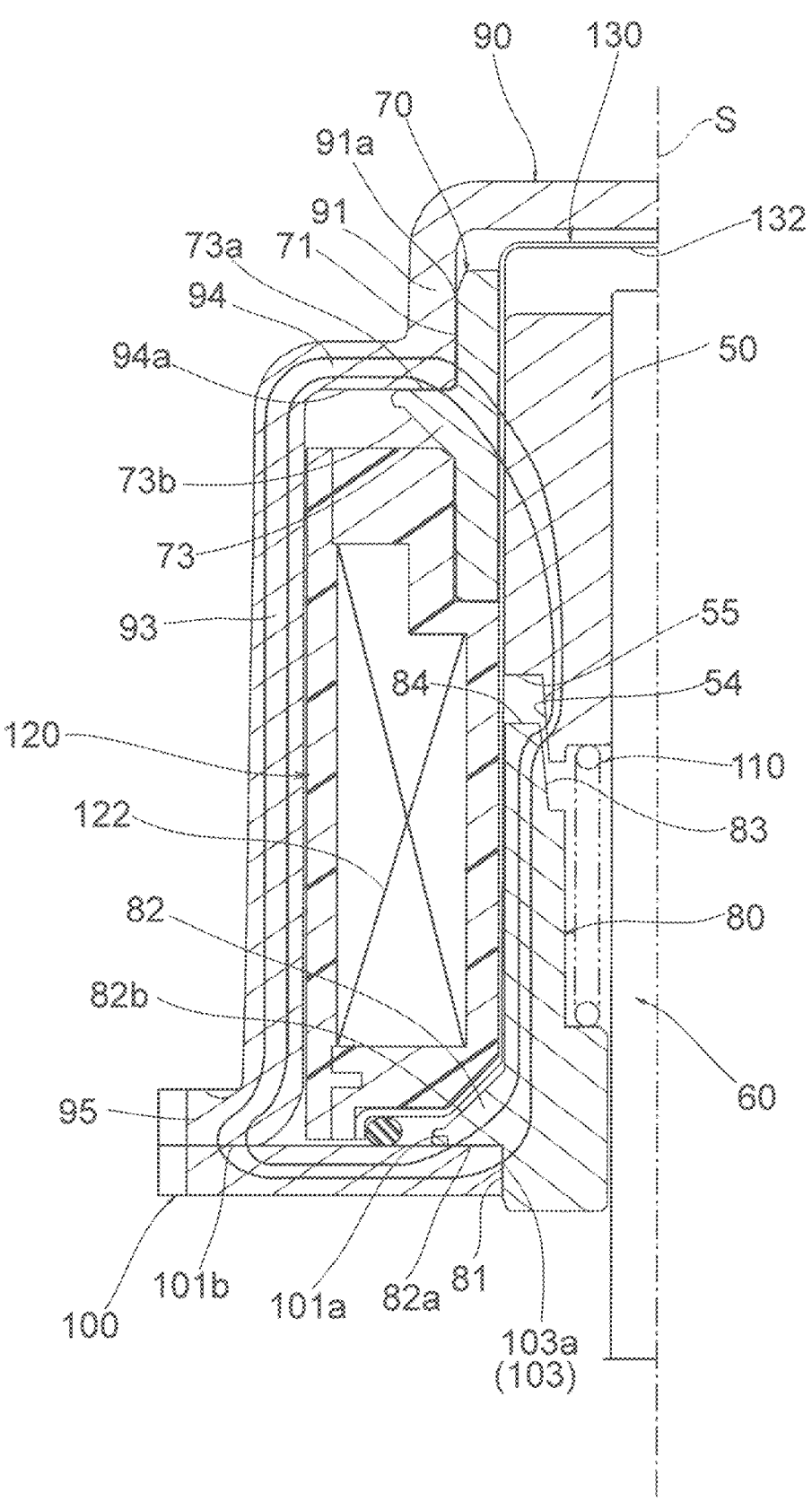
FIG. 11 is a partial cross-sectional view describing an operation of the electromagnetic actuator according to the first embodiment, and illustrating the movable element located halfway between the rest position and an operating position and the flow of lines of magnetic force.

Then, when the movable element 50 and the shaft 60 move in the direction of the axis S by a predetermined amount, as shown in FIG. 11, the lines of magnetic force flowing to the movable element 50 flow from the tip end side outer peripheral surface of the convex portion 54 of the movable element 50 into the inner peripheral surface of the concave portion 83 of the second inner yoke 80 near the tip end side.

In addition, the lines of magnetic force flow in the same manner in the first bonding region, the second bonding region, as well as other regions.

In addition, the movable element 50 and the shaft 60 resist the urging force of the urging spring 110 to arrive at the operating position with maximal movement in the direction of the axis S. The operating position corresponds to the position (FIG. 14) where the first valve body 20 is seated on the first valve seat 11*d*. In the operating position, the convex portion 54 of the movable element 50 is maintained in the state not in contact with the concave portion 83 of the second inner yoke 80.

Figure 12:
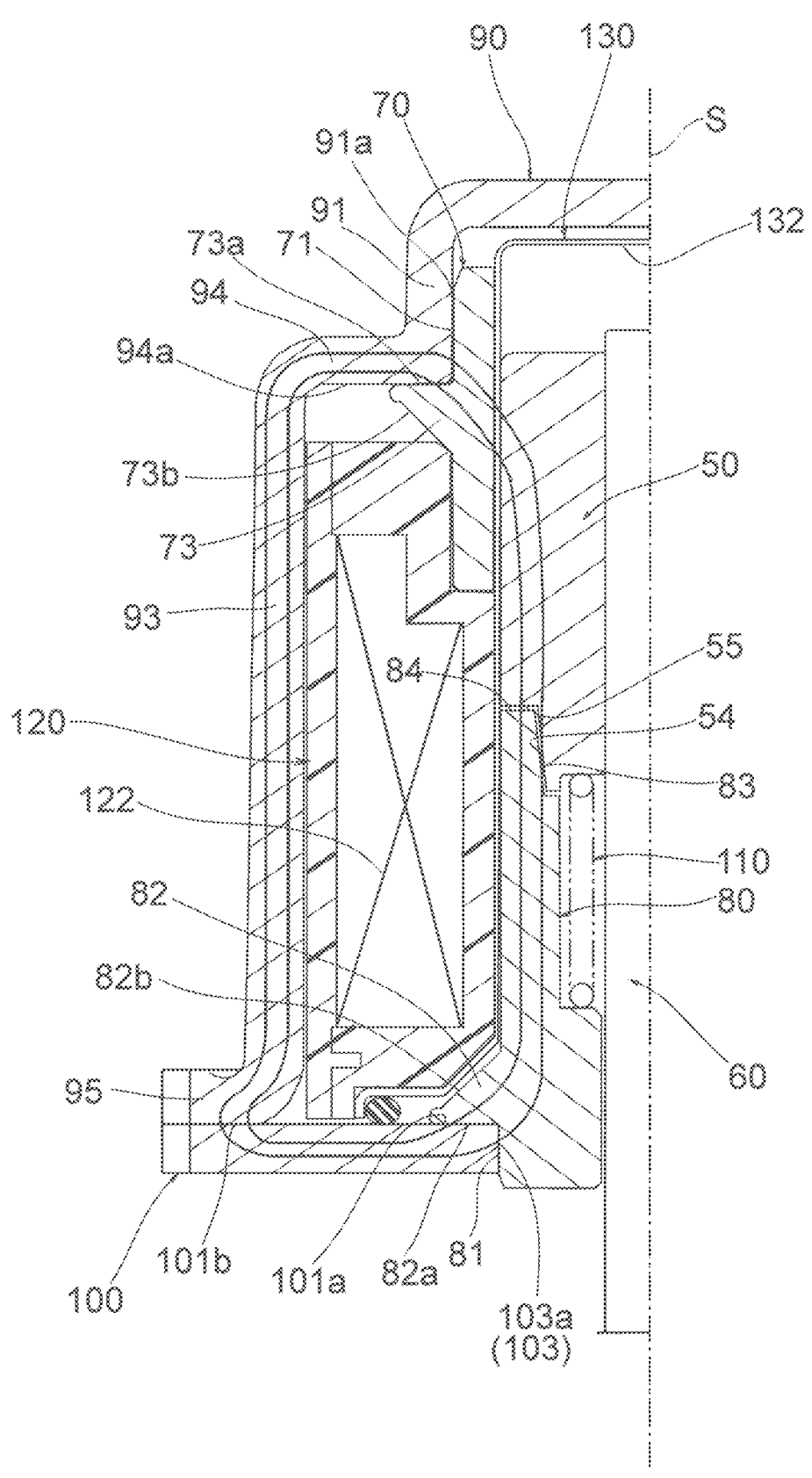
FIG. 12 is a partial cross-sectional view describing an operation of the electromagnetic actuator according to the first embodiment, and illustrating the movable element located at the operating position and the flow of lines of magnetic force.

In addition, in the operating position, the lines of magnetic force flowing to the movable element 50, as shown in FIG. 12, flow into the inner peripheral surface of the concave portion 83 and the annular end surface 84 of the second inner yoke 80 from the outer peripheral surface of the convex portion 54 and the annular end surface 55 of the movable element 50.

In addition, the lines of magnetic force flow in the same manner in the first bonding region, the second bonding region, as well as other regions.

Meanwhile, when the energization of the coil 122 is cut off, the movable element 50 and the shaft 60 move to the rest position as shown in FIG. 13 by using the urging force of the urging spring 110 and stop.

As described above, in the first bonding region between the first inner yoke 70 and the cylindrical yoke 90 and the second bonding region between the second inner yoke 80 and the flat yoke 100, the cross-sectional area of the magnetic path through which the lines of magnetic force pass increase and the magnetic path is reduced by using the first annular brim portion 73 and the second annular brim portion 82. Therefore, the magnetic resistance can be reduced (increased permeance). As a result, the magnetic saturation in the magnetic path can be resolved, and the lines of magnetic force (magnetic flux) that are generated can be used effectively to obtain the desired magnetic force (thrust).

In the following, the operation of a valve device according to an embodiment is described.

Firstly, in the state in which the coil 122 is not energized, as shown in FIG. 13, the movable element 50 and the shaft 60 are positioned at the rest position by using the urging force of the urging spring 110. At the rest position, the first valve body 20 is separated from the first valve seat 11*d* and opens the valve, and the second valve body 30 is seated on the second valve seat 11*e* and closes the valve.

Therefore, the fluid flowing from the upstream passage 12*a* flows to the first downstream passage 13*a* via the central chamber 11*f* and the first working chamber 11*g*.

Meanwhile, when the coil 122 is energized, the lines of magnetic force flowing as described above are generated and, as shown in FIG. 14, the movable element 50 is attracted by the second inner yoke 80, and the movable element 50 and the shaft 60 resist the urging force of the urging spring 110 to be positioned at the operating position. In the operating position, the first valve body 20 is seated on the first valve seat 11*d* and closes the valve, and the second valve body 30 is separated from the second valve seat 11*e* and opens the valve.

Therefore, the fluid flowing from the upstream passage 12*a* flows to the second downstream passage 14*a* via the central chamber 11*f* and the second working chamber 11*h*.

By switching the coil 122 between being energized and not energized, the fluid can flow from the first downstream passage 13*a* toward an external fluid outlet pipe or flow from the second downstream passage 14*a* toward another fluid outlet pipe.

Here, by using the electromagnetic actuator A with the configuration as the drive unit of the valve body, the desired driving force is obtained while the power consumption is reduced, and the opening/closing operation of the valve body can be reliably and smoothly performed.

Figure 15:
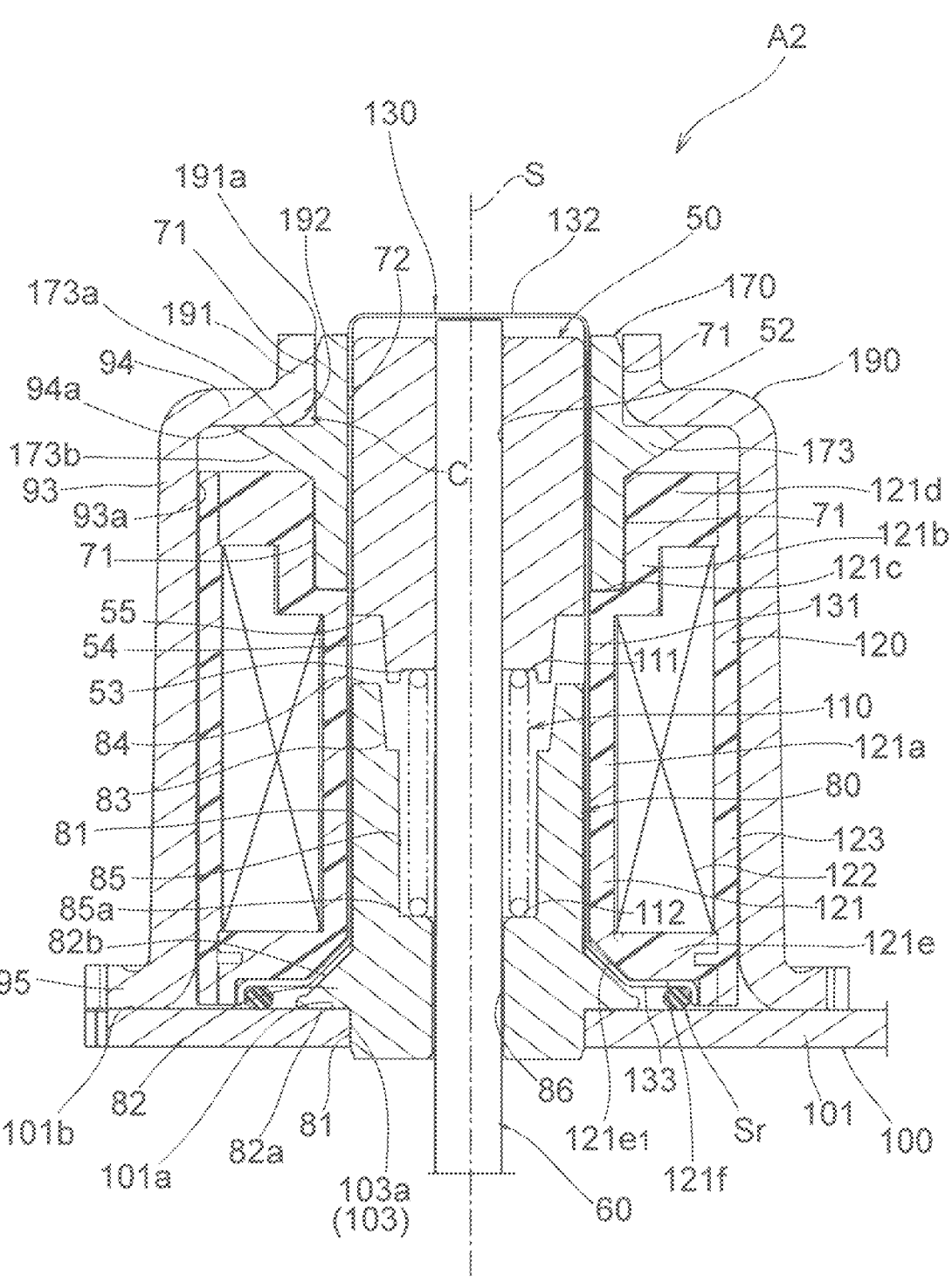
FIG. 15 is a cross-sectional view taken along a cross section including an axis of an electromagnetic actuator according to a second embodiment.

FIG. 15 is a view illustrating an electromagnetic actuator A2 according to a second embodiment. The second embodiment is the same as the first embodiment, except that a first inner yoke 170 and a cylindrical yoke 190 are adopted in place of the first inner yoke 70 and the cylindrical yoke 90, and components same as the first embodiment are labeled with the same symbols, while the description is omitted.

The electromagnetic actuator A2 of the second embodiment includes the movable element 50, the shaft 60, the first inner yoke 170, the second inner yoke 80, the cylindrical yoke 190 and the flat yoke 100 as the outer yoke, the urging spring 110, the coil module 120, the cylindrical member 130, and the sealing member Sr.

The first inner yoke 170 is formed by machining or forging using soft iron or the like, and functions as a magnetic path for passing lines of magnetic force. As shown in FIG. 15, the first inner yoke 170 is formed into a cylindrical shape, and includes the first outer peripheral surface 71, the inner peripheral surface 72, and the first annular brim portion 173.

The first annular brim portion 173 is formed into a disc shape that protrudes in the radial direction perpendicular to the axis S from the first outer peripheral surface 71, and includes an annular flat surface 173*a* and an annular tapered surface 173*b*.

The annular flat surface 173*a* is a flat surface perpendicular to the axis S, and is bonded to the annular bonding surface 94*a* of the cylindrical yoke 190 in the direction of the axis S.

The annular tapered surface 173*b* is formed on the side opposite to the annular flat surface 173*a*, and is formed to widen toward the annular bonding surface 94*a* of the cylindrical yoke 190.

Here, the first annular brim portion 173 is formed to be greater in the radial direction than the first annular brim portion 73 according to the first embodiment.

The cylindrical yoke 190 is a press-molded product that is press-formed (deep-drawn) into a bottomless cylindrical shape using a metal plate such as soft iron having a predetermined thickness so as to function as a magnetic path for passing lines of magnetic force. As shown in FIG. 15, the cylindrical yoke 190 includes a small-diameter cylindrical portion 191, a curved portion 192, the large-diameter cylindrical portion 93, the annular flat plate portion 94, the flange portion 95, and the cutout portion 96.

The small-diameter cylindrical portion 191 defines the inner peripheral surface 191*a* centered on the axis S. The first outer peripheral surface 71 of the first inner yoke 170 is fitted into the inner peripheral surface 191*a*. That is, the first inner yoke 170 is bonded and fixed to the cylindrical yoke 190 in the radial direction perpendicular to the axis S via the inner peripheral surface 191*a* of the small-diameter cylindrical portion 191.

In the inner region in which the small-diameter cylindrical portion 191 and the annular flat plate portion 94 are continuous, the curved portion 192 is formed by deep-drawing, and is formed to render an angle R (FIG. 16) with a predetermined radius in a cross section including the axis S. Therefore, in the state in which the first inner yoke 170 is assembled to the cylindrical yoke 190, a clearance C is provided between the root region of the first annular brim portion 173 and the cylindrical yoke 190. The clearance C is provided to increase the magnetic resistance so that it is difficult for the lines of magnetic force to pass through.

As a result, the small-diameter cylindrical portion 191 does not serve as the magnetic path, but serves as a fixing portion for fitting and fixing the first inner yoke 170.

Figure 16:
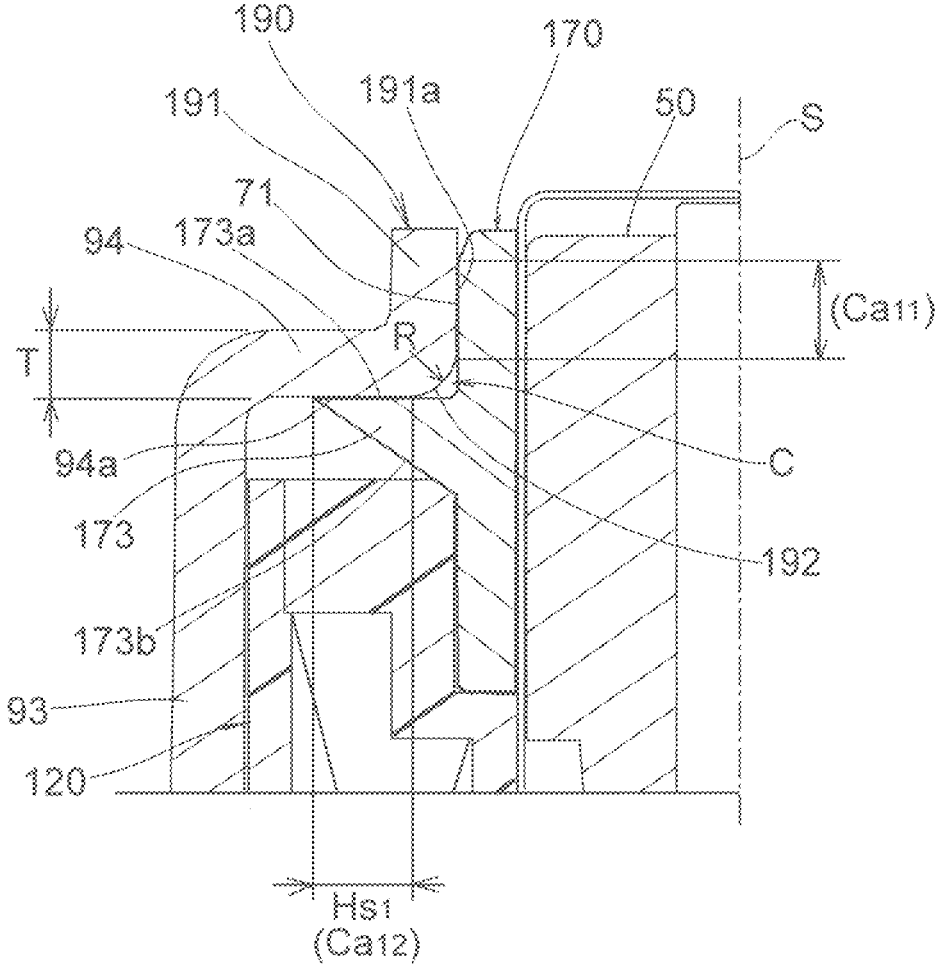
FIG. 16 is a partial cross-sectional view illustrating a first bonding region between a first inner yoke and an outer yoke (cylindrical yoke) of the electromagnetic actuator according to the second embodiment.

As described above, in the configuration including the first inner yoke 170 and the outer yoke (the cylindrical yoke 190), the first bonding region between the first inner yoke 170 and the cylindrical yoke 190, as shown in FIG. 16, is the bonding region $Ca_{11}$ between the first outer peripheral surface 71 and the inner peripheral surface 191a and the bonding region $Ca_{12}$ between the annular flat surface 173a and the annular bonding surface 94a.

In the cross section including the axis S as shown in FIG. 16, when the plate thickness of the cylindrical yoke 190 is set as T, and the bonding length of the bonding region $Ca_{12}$ in the radial direction is set as $Hs_1$, a relationship $T<Hs_1$ is satisfied.

That is, the first bonding region between the first inner yoke 170 and the cylindrical yoke 190 as the outer yoke has the bonding length $Hs_1$ greater than the plate thickness T of the cylindrical yoke 190 in the cross-section including the axis S. In this way, compared with the case where the bonding region between the first inner yoke 170 and the cylindrical yoke 190 is the bonding length of the plate thickness T of the cylindrical yoke 190 alone, a longer bonding length $Hs_1$ can be obtained. Therefore, magnetic resistance can be reduced (increased permeance). As a result, in the first bonding region, the magnetic flux generated through energizing the coil 122 can be effectively used without having magnetic saturation.

In addition, by providing the first annular brim portion 173 as the bonding region between the first inner yoke 170 and the cylindrical yoke 190, the magnetic path area of the bonding interface can be increased while the magnetic path can be decreased, and the magnetic resistance can be effectively reduced (permeance is increased).

In particular, by providing the first annular brim portion 173, at the time of fixing the first inner yoke 170 to the cylindrical yoke 190, the first outer peripheral surface 71 is fitted into the inner peripheral surface 191a to be radially positioned, the annular flat surface 173a can be bonded to the annular bonding surface 194a to be positioned in the direction of the axis S, the fixing can be firm simply by combination through fitting without welding, etc., and mechanical stiffness can be ensured.

In addition, by providing the annular tapered surface 173b on the side opposite to the annular flat surface 173a of the first annular brim portion 173, the weight and size can be reduced by removing a region where the function as a magnetic path is difficult to achieve, while the space for arranging the bobbin 121 can be secured.

In particular, by providing the clearance C, the lines of magnetic force do not pass through the bonding region $Ca_{11}$ between the first outer peripheral surface 71 and the inner peripheral surface 191a, but actively pass through the bonding region $Ca_{11}$ between the annular flat surface 173a and the annular bonding surface 94a. Accordingly, the magnetic path can be reduced, and the magnetic resistance can be reduced (increased permeance).

As a result, in the first bonding region, the magnetic flux generated through energizing the coil 122 can be effectively used without having magnetic saturation.

In addition, with a bottomless shape, the cylindrical yoke 190 can have a simpler structure, a smaller size, and a lighter weight when compared with a bottomed shape.

Then, the operation of the electromagnetic actuator A2 with the above configuration is described with reference to FIGS. 17 to 19. The rest state in which the coil 122 is not energized is the same as the first embodiment.

Figure 17:
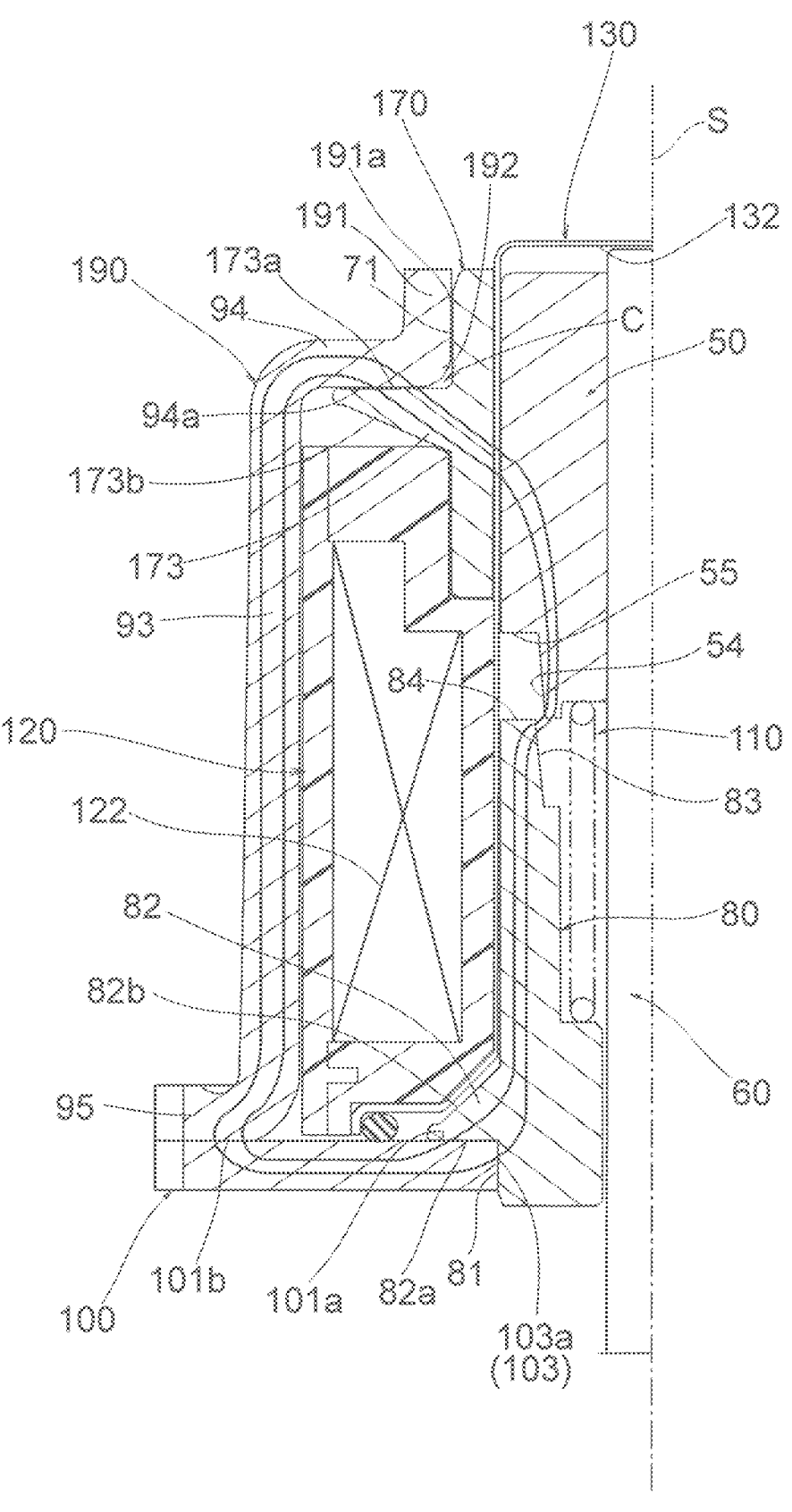
FIG. 17 is a partial cross-sectional view describing an operation of the electromagnetic actuator according to the second embodiment, and illustrating a a movable element immediately after a coil is energized at a rest position and a flow of lines of magnetic force.

Immediately after the coil 122 is energized in the rest state, the lines of magnetic force flow, as shown in FIG. 17. That is, in the first bonding region between the first inner yoke 170 and the cylindrical yoke 190, the lines of magnetic force passing through the annular flat plate portion 94 flow from the annular bonding surface 94a to the movable element 50 through the annular flat surface 173a of the first annular brim portion 173.

In addition, in the portion between the movable element 50 and the second inner yoke 80 and the second bonding region between the second inner yoke 80 and the flat yoke 100, the second embodiment is the same as the first embodiment.

Then, the lines of magnetic force flowing into the flat yoke 100 flow from the annular bonding surface 101b to the cylindrical yoke 190 via the flange portion 95. Through the flow of the lines of magnetic force, a close-loop magnetic path is formed.

Figure 18:
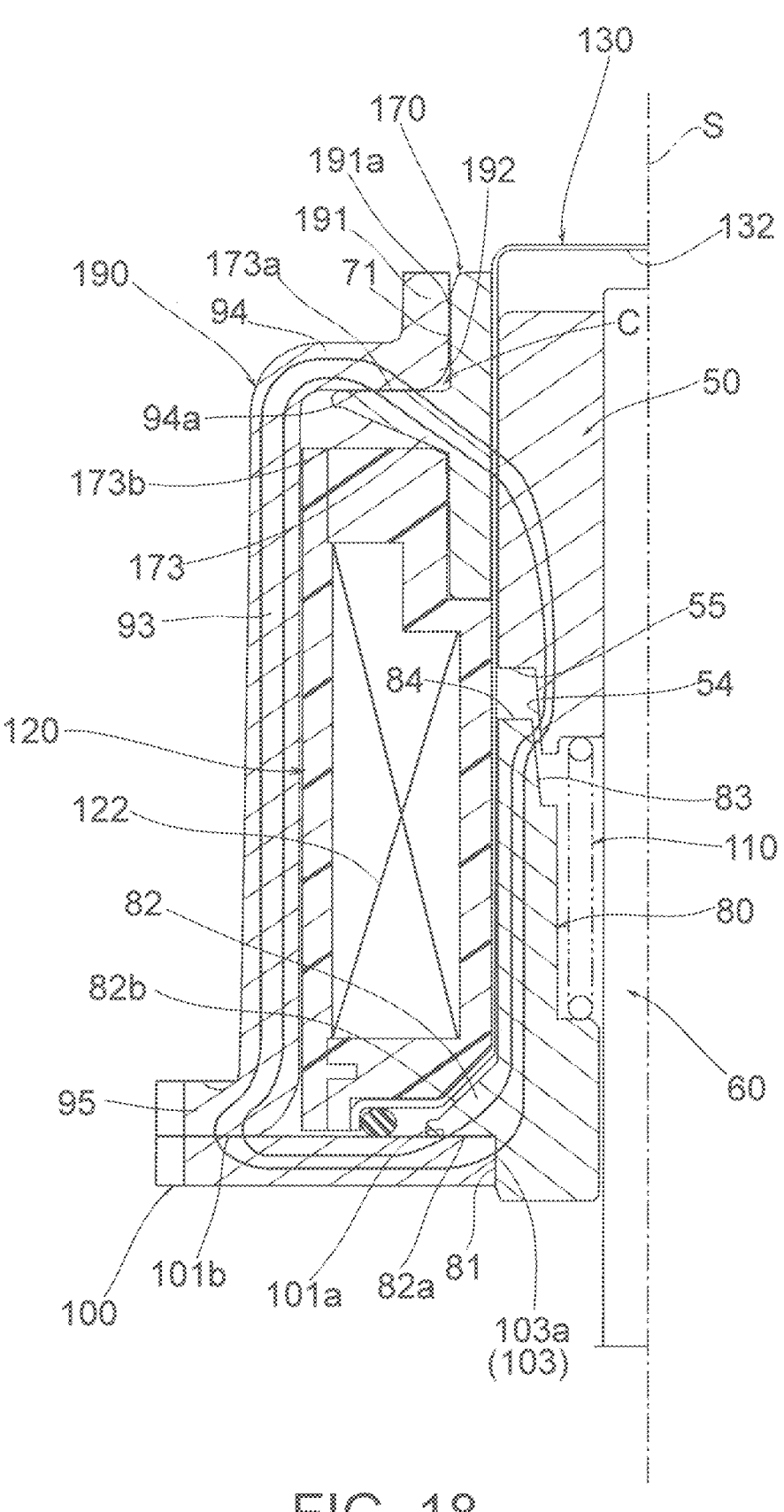
FIG. 18 is a partial cross-sectional view describing an operation of the electromagnetic actuator according to the second embodiment, and illustrating the movable element located halfway between the rest position and an operating position and the flow of lines of magnetic force.
Figure 19:
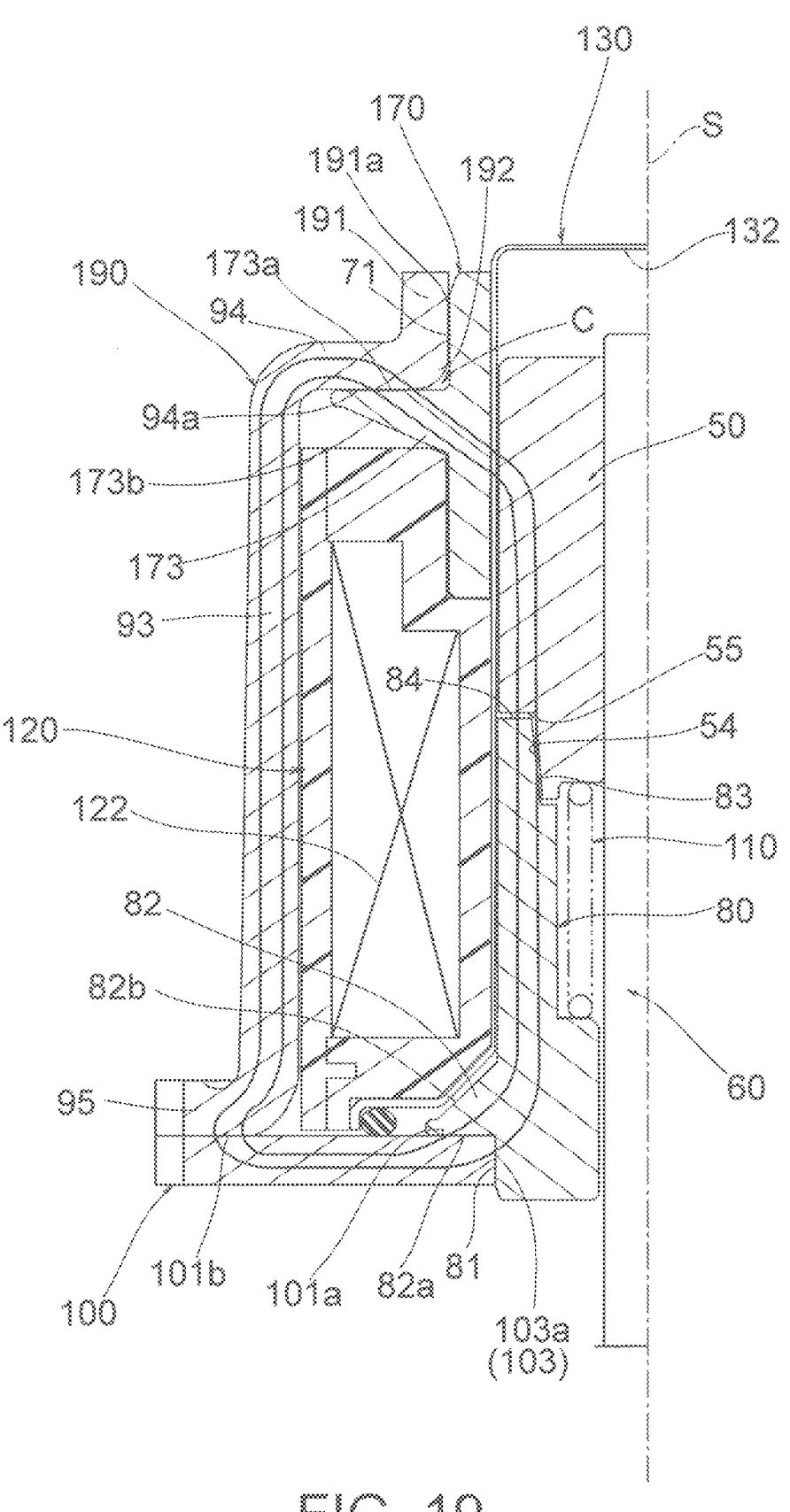
FIG. 19 is a partial cross-sectional view describing an operation of the electromagnetic actuator according to the second embodiment, and illustrating the movable element located at the operating position and the flow of lines of magnetic force.

Then, when the movable element 50 and the shaft 60 move in the direction of the axis S by a predetermined amount, as shown in FIG. 18, the lines of magnetic force flowing to the movable element 50 flow from the tip end side outer peripheral surface of the convex portion 54 of the movable element 50 to the inner peripheral surface of the concave portion 83 of the second inner yoke 80 near the tip end side. In addition, the lines of magnetic force flow in the same manner in the first bonding region, the second bonding region, as well as other regions.

In addition, the movable element 50 and the shaft 60 resist the urging force of the urging spring 110 to arrive at the operating position with maximal movement in the direction of the axis S. The operating position corresponds to the position where the first valve body 20 is seated on the first valve seat 11d, and the convex portion 54 of the movable element 50 is maintained in the state not in contact with the concave portion 83 of the second inner yoke 80. The lines of magnetic force flowing to the movable element 50, as shown in FIG. 19, flow from the outer peripheral surface of the convex portion 54 and the annular end surface 55 of the movable element 50 into the inner peripheral surface of the concave portion 83 and the annular end surface 84 of the second inner yoke 80. In addition, the lines of magnetic force flow in the same manner in the first bonding region, the second bonding region, as well as other regions.

Meanwhile, when the energization of the coil 122 is cut off, the movable element 50 and the shaft 60 move to the rest position as shown in FIG. 13 by using the urging force of the urging spring 110 and stop.

As described above, in the first bonding region between the first inner yoke 170 and the cylindrical yoke 190 and the second bonding region between the second inner yoke 80 and the flat yoke 100, the cross-sectional area of the magnetic path through which the lines of magnetic force pass increase and the magnetic path is reduced by using the first annular brim portion 173 and the second annular brim portion 82. Therefore, the magnetic resistance can be reduced (increased permeance). As a result, the magnetic saturation in the magnetic path can be resolved, and the lines of magnetic force (magnetic flux) that are generated can be used effectively to obtain the desired magnetic force (thrust).

Figure 20:
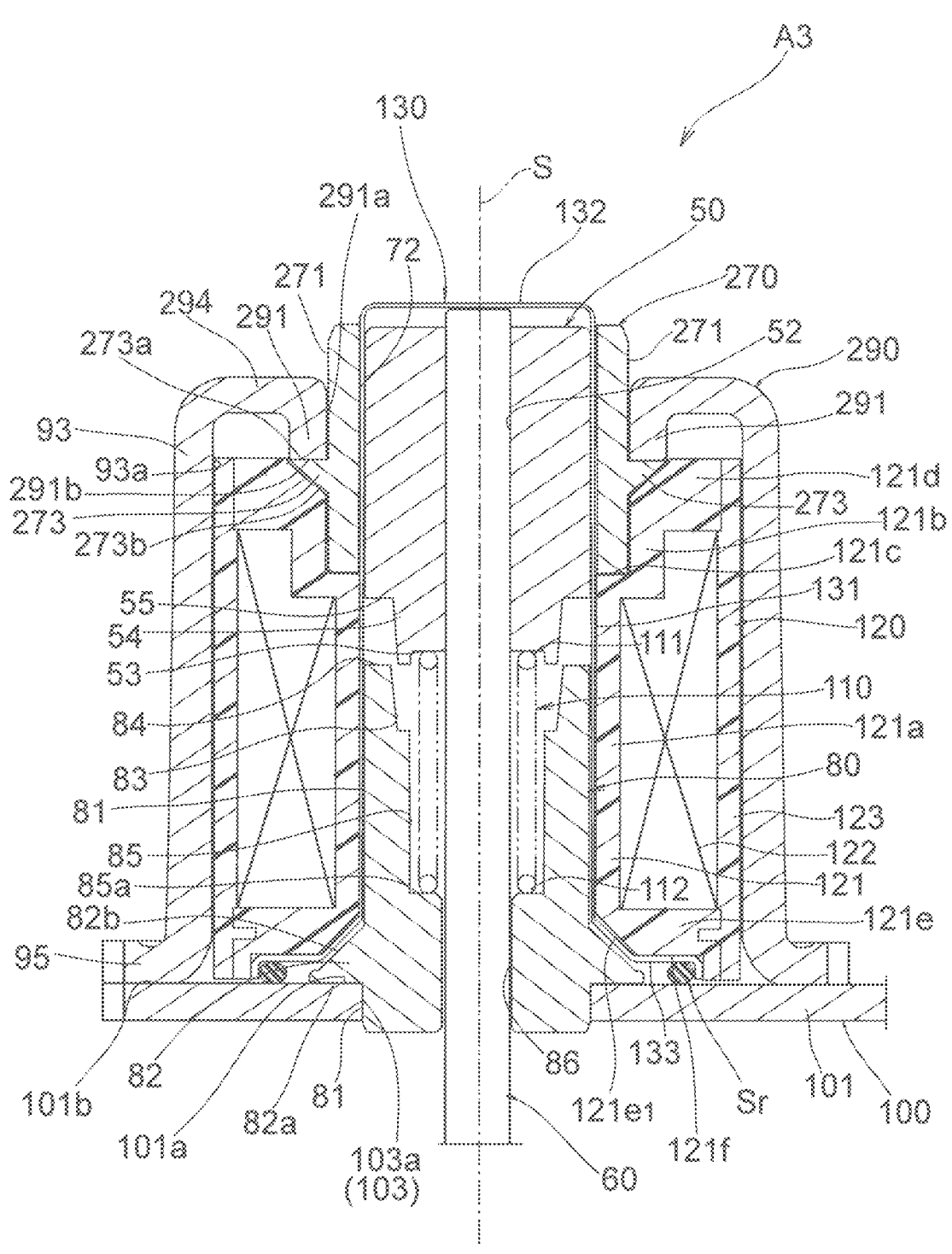
FIG. 20 is a cross-sectional view taken along a cross section including an axis of an electromagnetic actuator according to a third embodiment.
Figure 21:
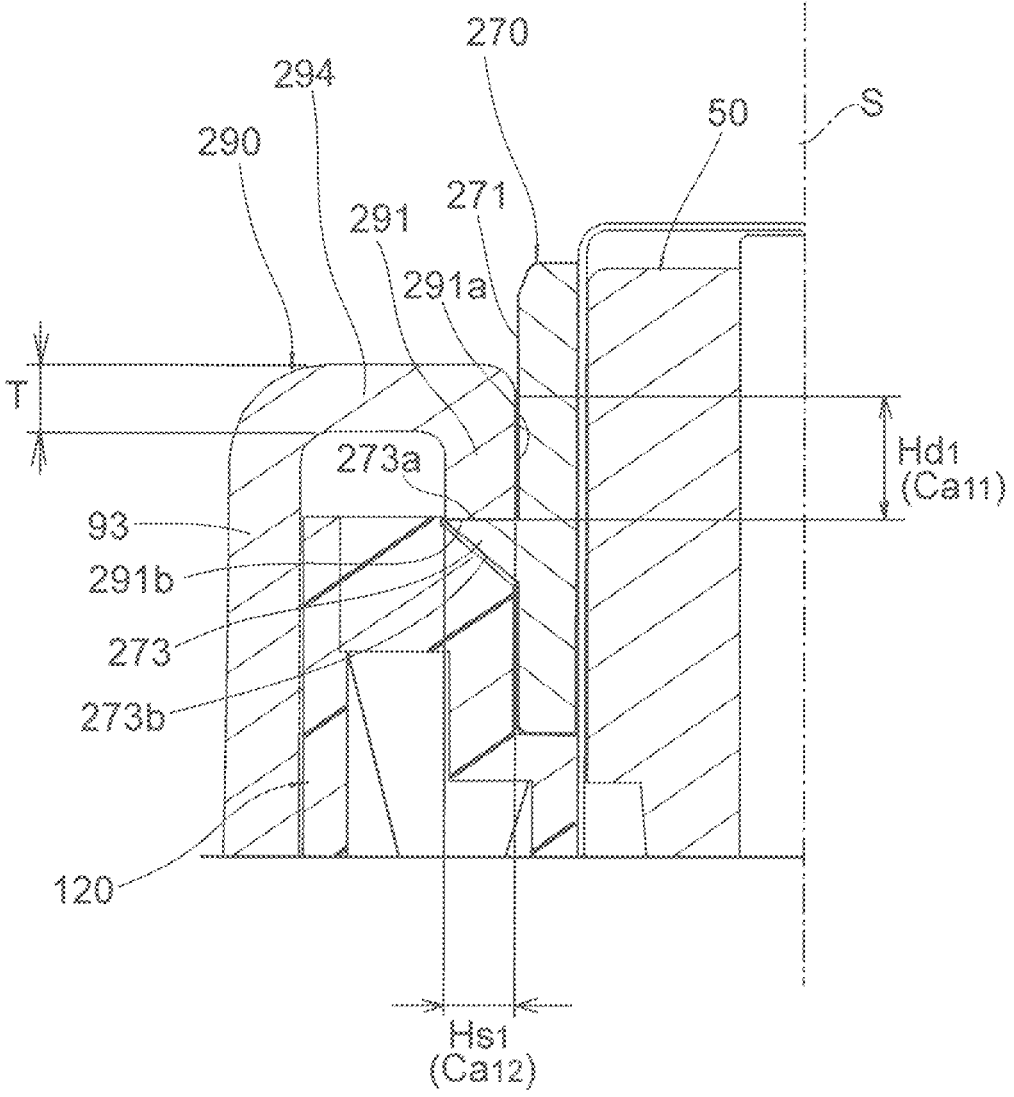
FIG. 21 is a partial cross-sectional view illustrating a first bonding region between a first inner yoke and an outer yoke (cylindrical yoke) of the electromagnetic actuator according to the third embodiment.

FIGS. 20 and 21 illustrate an electromagnetic actuator A3 according to a third embodiment. The third embodiment is the same as the first embodiment, except that a first inner yoke 270 and a cylindrical yoke 290 are adopted in place of the first inner yoke 70 and the cylindrical yoke 90, and components same as the first embodiment are labeled with the same symbols, while the description is omitted.

The electromagnetic actuator A3 of the third embodiment includes the movable element 50, the shaft 60, the first inner yoke 270, the second inner yoke 80, the cylindrical yoke 290 and the flat yoke 100 as the outer yoke, the urging spring 110, the coil module 120, the cylindrical member 130, and the sealing member Sr.

The first inner yoke 270 is formed by machining or forging using soft iron or the like, and functions as a magnetic path for passing lines of magnetic force. As shown in FIG. 20, the first inner yoke 170 is formed into a cylindrical shape, and includes the first outer peripheral surface 271, the inner peripheral surface 72, and the first annular brim portion 273.

The first outer peripheral surface 271 is formed as a cylindrical surface centered on the axis S, and is formed to be fitted into the inner peripheral surface 291a of the small-diameter cylindrical portion 291 of the cylindrical yoke 290 and fitted into the bobbin 121 of the coil module 120. The first annular brim portion 273 is formed into a disc shape that protrudes in the radial direction perpendicular to the axis S from the first outer peripheral surface 271, and includes an annular flat surface 273a and an annular tapered surface 273b.

The annular flat surface 273a is a flat surface perpendicular to the axis S, and is bonded to the annular bonding surface 291b of the cylindrical yoke 290 in the direction of the axis S. The annular tapered surface 273b is formed on the side opposite to the annular flat surface 273a, and is formed to widen toward the annular bonding surface 291a of the cylindrical yoke 290.

The cylindrical yoke 290 is a press-molded product that is press-formed (deep-drawn) into a bottomless cylindrical shape using a metal plate such as soft iron having a predetermined thickness so as to function as a magnetic path for passing lines of magnetic force. As shown in FIG. 20, the cylindrical yoke 290 includes a small-diameter cylindrical portion 291, the large-diameter cylindrical portion 93, an annular flat plate portion 294, the flange portion 95, and the cutout portion 96.

The small-diameter cylindrical portion 291 defines the inner peripheral surface 291a centered on the axis S and the annular bonding surface 291b. The first outer peripheral surface 271 of the first inner yoke 270 is fitted into the inner peripheral surface 291a. That is, the first inner yoke 270 is bonded and fixed to the cylindrical yoke 290 in the radial direction perpendicular to the axis S via the inner peripheral surface 291a of the small-diameter cylindrical portion 291. The annular flat surface 273a of the first annular brim portion 273 of the first inner yoke 270 is bonded to the annular bonding surface 291b in the direction of the axis S.

As described above, in the configuration including the first inner yoke 270 and the outer yoke (the cylindrical yoke 290 and the flat yoke 100), the first bonding region between the first inner yoke 270 and the cylindrical yoke 290, as shown in FIG. 21, is the bonding region Can between the first outer peripheral surface 271 and the inner peripheral surface 291a and the bonding region $Ca_{11}$ between the annular flat surface 273a and the annular bonding surface 294a.

In the cross section including the axis S as shown in FIG. 21, when the plate thickness of the cylindrical yoke 290 is set as T, the bonding length of the bonding region $Ca_{11}$ in the direction of the axis is set as $Hd_1$, and the bonding length of the bonding region $Ca_{12}$ in the radial direction is set as $Hs_1$, the relationship $T<(Hd_1+Hs_1)$ is satisfied.

That is, the first bonding region between the first inner yoke 270 and the cylindrical yoke 290 as the outer yoke has a bonding length $(Hd_1+Hs_1)$ greater than the plate thickness T of the cylindrical yoke 90 in the cross section including the axis S. In this way, compared with the case where the bonding region between the first inner yoke 270 and the cylindrical yoke 290 is the bonding length of the plate thickness T of the cylindrical yoke 290 alone, a longer bonding length $(Hd_1+Hs_1)$ can be obtained. Therefore, magnetic resistance can be reduced (increased permeance). As a result, in the first bonding region, the magnetic flux generated through energizing the coil 122 can be effectively used without having magnetic saturation.

In addition, by providing the first annular brim portion 273 as the bonding region between the first inner yoke 270 and the cylindrical yoke 290, the magnetic path area of the bonding interface can be increased while the magnetic path can be decreased, and the magnetic resistance can be effectively reduced (permeance is increased).

In particular, by providing the first annular brim portion 273, at the time of fixing the first inner yoke 270 to the cylindrical yoke 290, the first outer peripheral surface 271 is fitted into the inner peripheral surface 291a to be radially positioned, the annular flat surface 273a can be bonded to the annular bonding surface 94a to be positioned in the direction of the axis S, the fixing can be firm simply by combination through fitting without welding, etc., and mechanical stiffness can be ensured.

In addition, by providing the annular tapered surface 273b on the side opposite to the annular flat surface 273a of the first annular brim portion 273, the weight and size can be reduced by removing a region where the function as a magnetic path is difficult to achieve, while the space for arranging the bobbin 121 can be secured.

In addition, with a bottomless shape, the cylindrical yoke 290 can have a simpler structure, a smaller size, and a lighter weight than a bottomed shape.

In the embodiments, as the outer yoke, the configuration including the cylindrical yoke 90, 190, 290 and the flat yoke 100 is shown. However, the disclosure is not limited thereto. An outer yoke of other forms may be adopted as long as the configuration of the first bonding region between the first inner yoke and the outer yoke and the second bonding region between the second inner yoke and the outer yoke of the disclosure is formed.

In the embodiments, the configuration in which the first bonding region between the first inner yoke 70, 170, 270 and the outer yoke (the cylindrical yoke 90, 190, 290) and the second bonding region between the second inner yoke 80 and the outer yoke (the flat yoke 100) have the bonding lengths greater than the plate thickness T of the outer yoke in the cross section including the axis S. However, the disclosure is not limited thereto. It may also be that only one of the first bonding region and the second bonding area region adopts the configuration of the disclosure.

In the embodiments, the configuration in which the seal member 40 forming a structure similar to a diaphragm is adopted as a forming element of the valve device, so as to prevent foreign matter in the fluid from entering the side of the electromagnetic actuators A, A2, A3 is shown. However, the disclosure is not limited thereto. It may also be that, a lip-shaped seal is fit at the end of the guide hole 86 of the second inner yoke, for example to seal the periphery of the shaft 60. Accordingly, the pressure of the fluid does not act on the movable portion, and the movable element and the valve body can be driven by a smaller electromagnetic force.

According to the above, in the electromagnetic actuator according to the embodiments of the disclosure, the structure can be simplified, the cost can be reduced, and the functional reliability is facilitated, while the flow of the lines of magnetic force (magnetic flux) can be improved to resolve magnetic saturation, and a thrust can be obtained. Therefore, in addition to being applicable as the drive unit of the valve device in the cooling water circulation system or the like of a vehicle, the electromagnetic actuator according to the embodiments of the disclosure can also be used as a drive unit in other fields.

What is claimed is:

1. An electromagnetic actuator, comprising:
a movable element, reciprocating along a predetermined axis; a coil for excitation; a shaft, fixed to the movable element; a first inner yoke, movably receiving the movable element; a second inner yoke, attracting the movable element through energization of the coil and movably receiving the shaft; and an outer yoke, surrounding the coil and bonded to the first inner yoke and the second inner yoke,
wherein in a cross section comprising the axis, a first bonding region between the first inner yoke and the outer yoke and/or a second bonding region between the second inner yoke and the outer yoke have a bonding length greater than a plate thickness of the outer yoke.

2. The electromagnetic actuator as claimed in claim 1, wherein the outer yoke comprises a bottomed or bottomless cylindrical yoke and a flat yoke bonded to an opening end of the cylindrical yoke,
the first inner yoke is bonded to the cylindrical yoke, and the second inner yoke is bonded to the flat yoke.

3. The electromagnetic actuator as claimed in claim 2, wherein the first inner yoke comprises: a first outer peripheral surface centered on the axis; and a first annular brim portion protruding radially from the first outer peripheral surface, and
the cylindrical yoke comprises: an inner peripheral surface, fitted into the first outer peripheral surface; and an annular bonding surface, bonded to the first annular brim portion in a direction of the axis.

4. The electromagnetic actuator as claimed in claim 3, wherein the cylindrical yoke comprises: a small-diameter cylindrical portion; a large-diameter cylindrical portion forming a diameter greater than the small-diameter cylindrical portion; and an annular flat plate portion, connecting the small-diameter cylindrical portion and the large-diameter cylindrical portion,
the small-diameter cylindrical portion defines the inner peripheral surface, and
the annular flat plate portion defines the annular bonding surface.

5. The electromagnetic actuator as claimed in claim 4, wherein, in the first bonding region, a clearance is provided between a root region of the first annular brim portion and the cylindrical yoke.

6. The electromagnetic actuator as claimed in claim 5, wherein the cylindrical yoke is a press-molded product that is press-formed.

7. The electromagnetic actuator as claimed in claim 3, wherein, on a side opposite to an annular flat surface bonded to the cylindrical yoke, the first annular brim portion has an annular tapered surface that widens toward the annular bonding surface of the cylindrical yoke.

8. The electromagnetic actuator as claimed in claim 2, wherein the second inner yoke comprises: a second outer peripheral surface centered on the axis; and a second annular brim portion protruding radially from the second outer peripheral surface, and
the flat yoke comprises: a fitting hole, defining an inner peripheral surface fitted into the second outer peripheral surface; and an annular bonding surface, bonded to the second annular brim portion in a direction of the axis.

9. The electromagnetic actuator as claimed in claim 8, wherein, on a side opposite to an annular flat surface bonded to the flat yoke, the second annular brim portion has an annular tapered surface that widens toward the annular bonding surface of the flat yoke.

10. The electromagnetic actuator as claimed in claim 2, wherein the cylindrical yoke comprises a flange portion bonded to the flat yoke.

11. The electromagnetic actuator as claimed in claim 2, comprising a cylindrical member, housing the movable element and the second inner yoke and having a bottomed cylindrical shape exposing the shaft to outside.

12. A valve device, comprising:
a housing, defining an upstream passage and a downstream passage through which fluid passes and a valve seat interposed between the upstream passage and the downstream passage;
a valve body, reciprocating to be seated and separated with respect to the valve seat; and
a drive unit, driving the valve body,
wherein the drive unit is the electromagnetic actuator as claimed in claim 1, and
the valve body is fixed to the shaft of the electromagnetic actuator.

13. The valve device as claimed in claim 12, wherein the downstream passage comprises a first downstream passage and a second downstream passage branching from the upstream passage,
the valve seat comprises a first valve seat facing the first downstream passage and a second valve seat facing the second downstream passage, and
the valve body comprises a first valve body corresponding to the first valve seat and a second valve body corresponding to the second valve seat, the first valve body and the second valve body being separated from each other in the direction of the axis.

14. The valve device as claimed in claim 13, wherein, at a time when the coil comprised in the electromagnetic actuator is not energized,
the first valve body is separated from the first valve seat, and the second valve body is seated on the second valve seat, and
at a time when the coil comprised in the electromagnetic actuator is energized,
the first valve body is seated on the first valve seat, and the second valve body is separated from the second valve seat.

15. The valve device as claimed in claim 12, wherein a flat yoke of the electromagnetic actuator comprises an attachment portion for attachment to an applicable target.

* * * * *